Aug. 28, 1951 A. MATHISEN 2,566,235
FIRE PREVENTING MEANS FOR POWER PLANTS,
PARTICULARLY ON AIRCRAFT
Filed Nov. 30, 1943 16 Sheets-Sheet 7
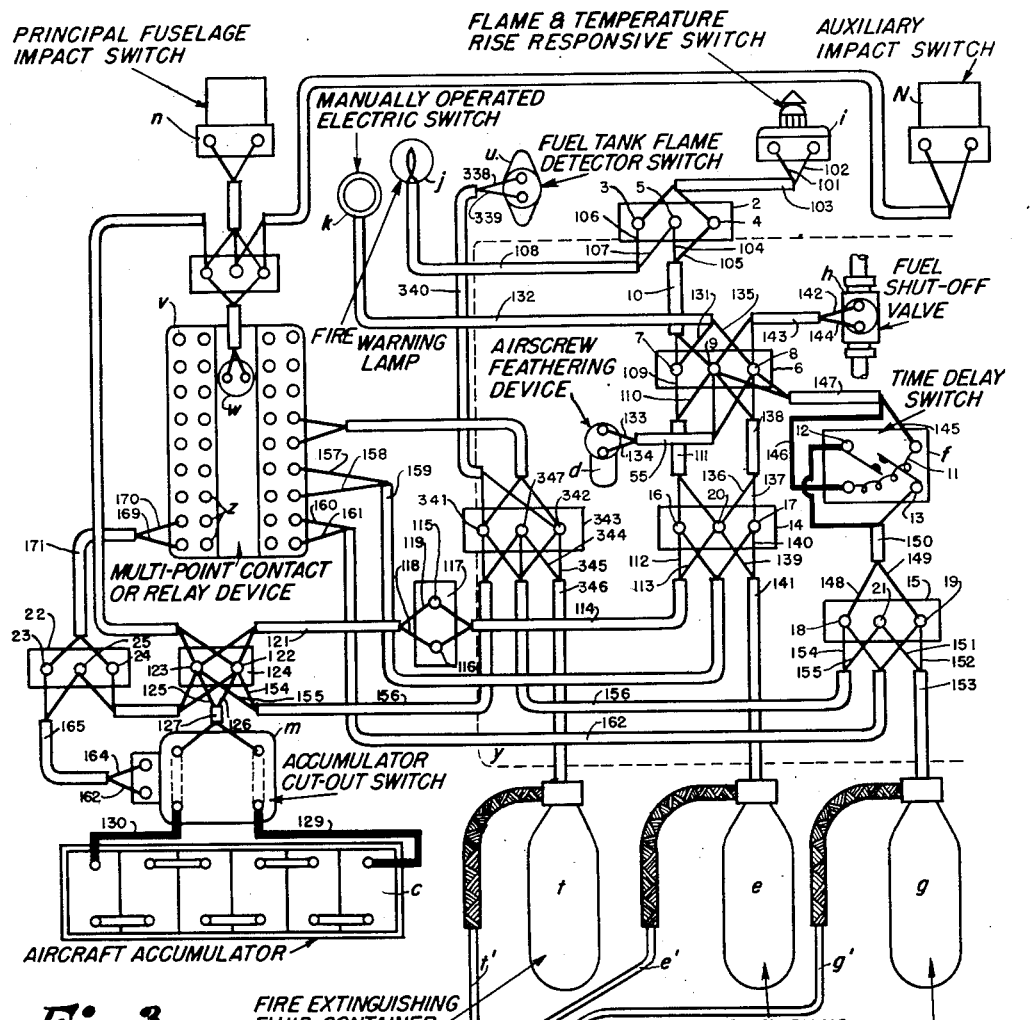
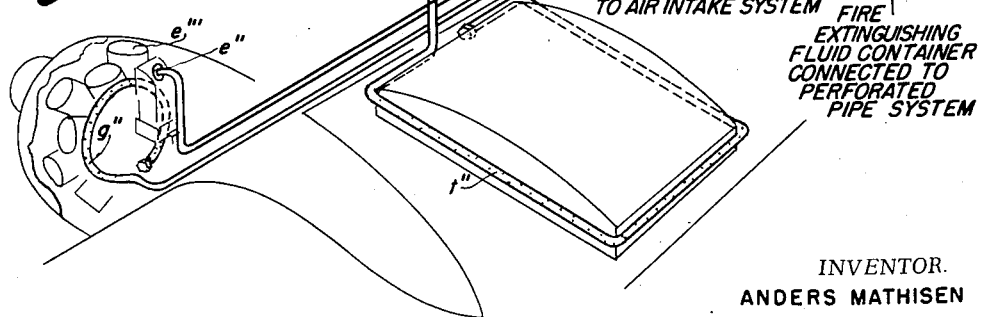
Fig 3
INVENTOR.
ANDERS MATHISEN
BY
his ATTORNEY

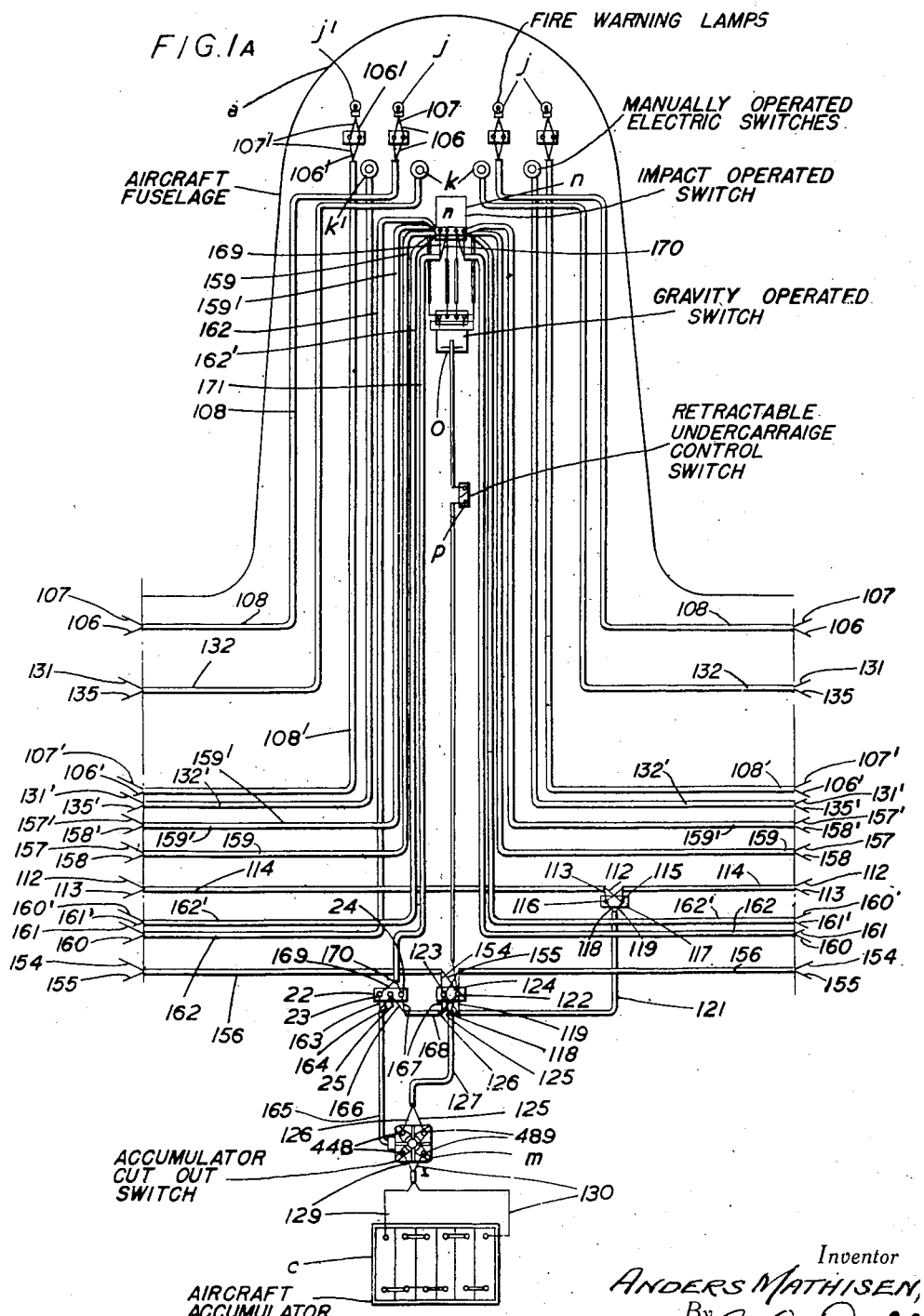

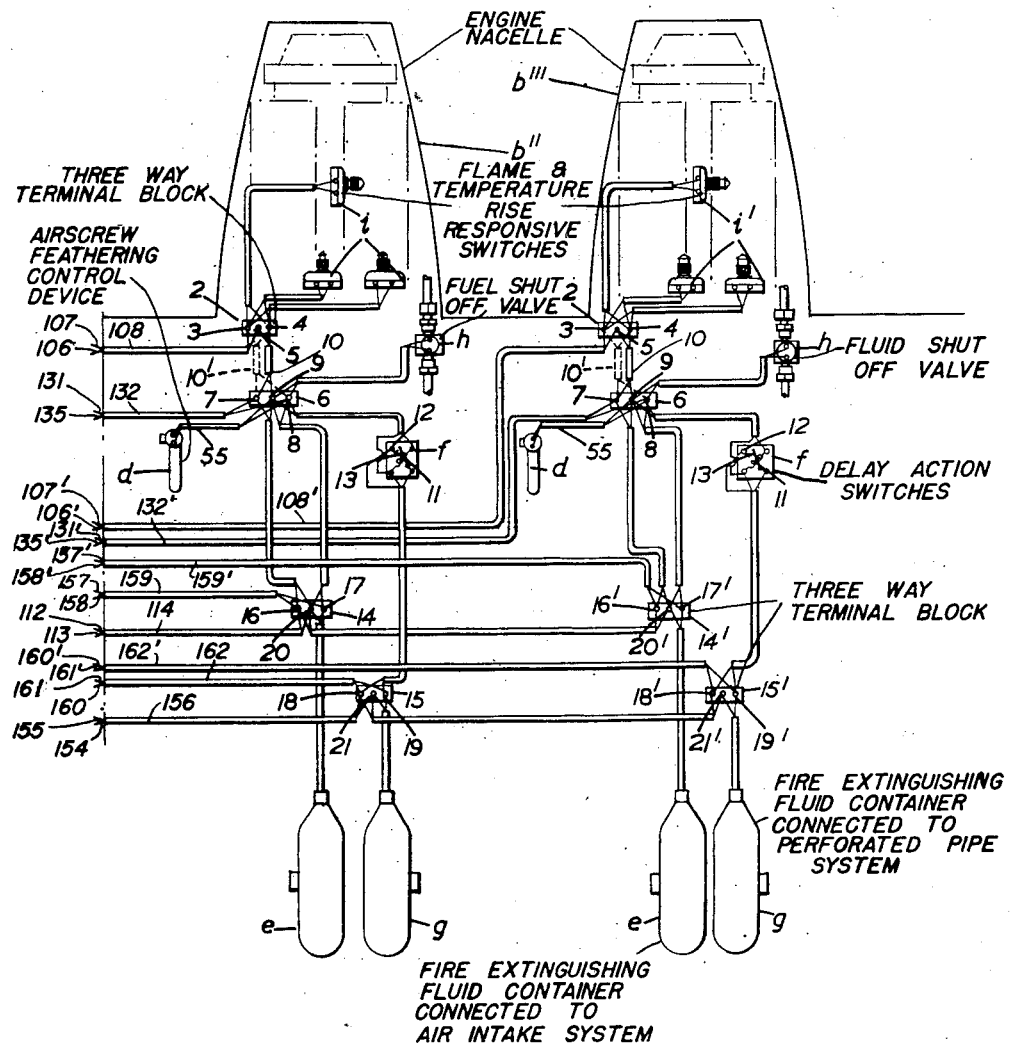

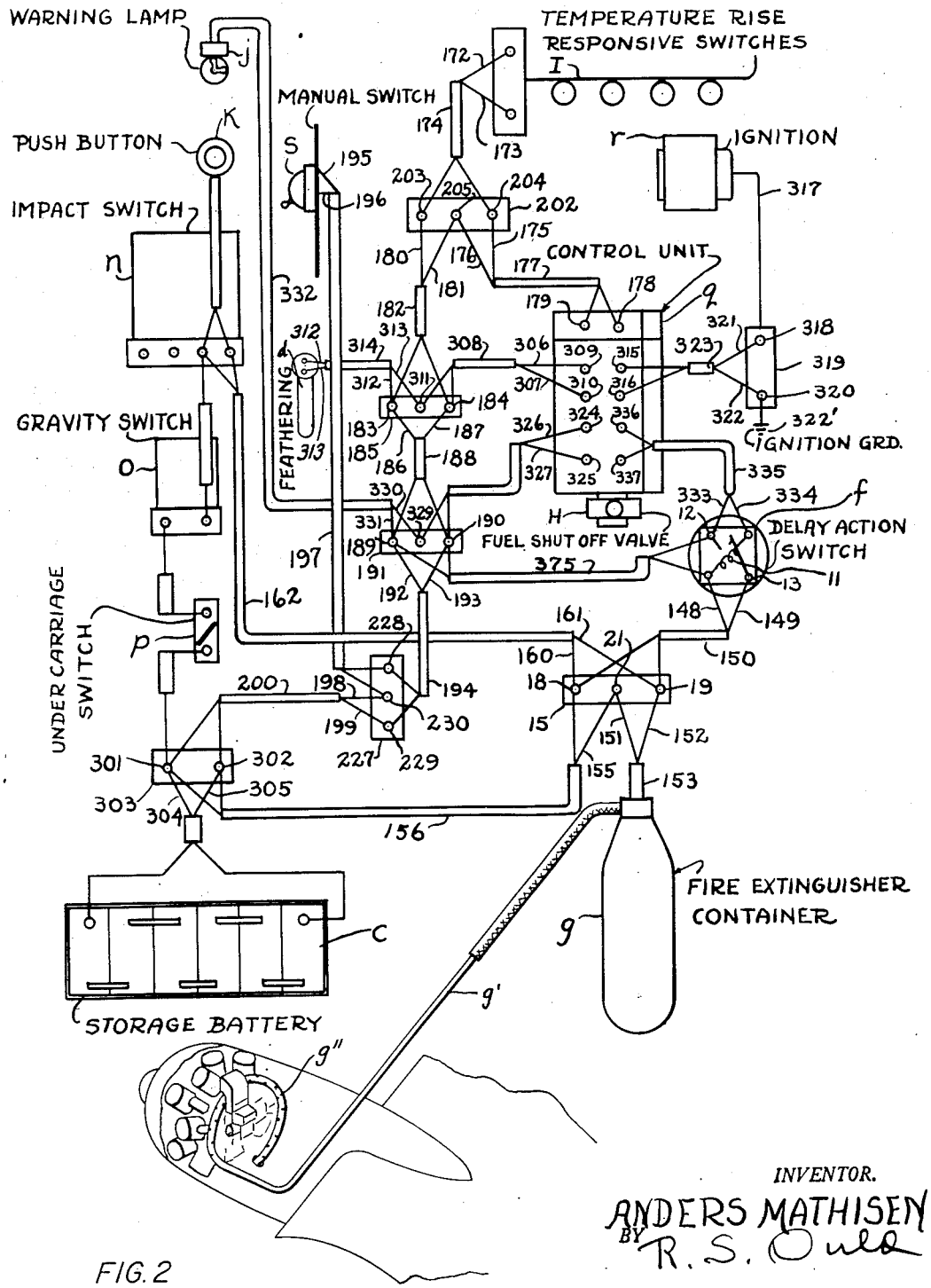

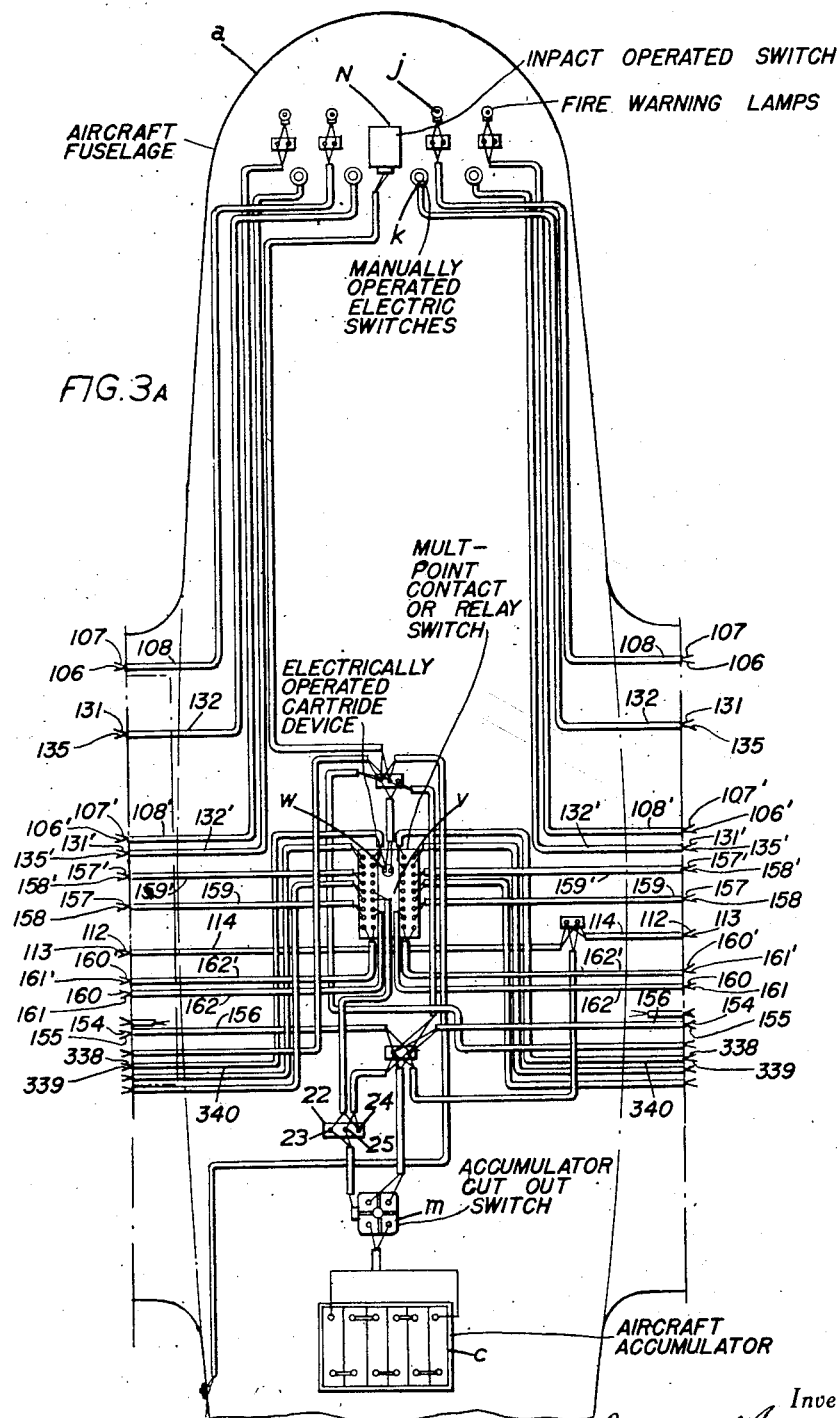

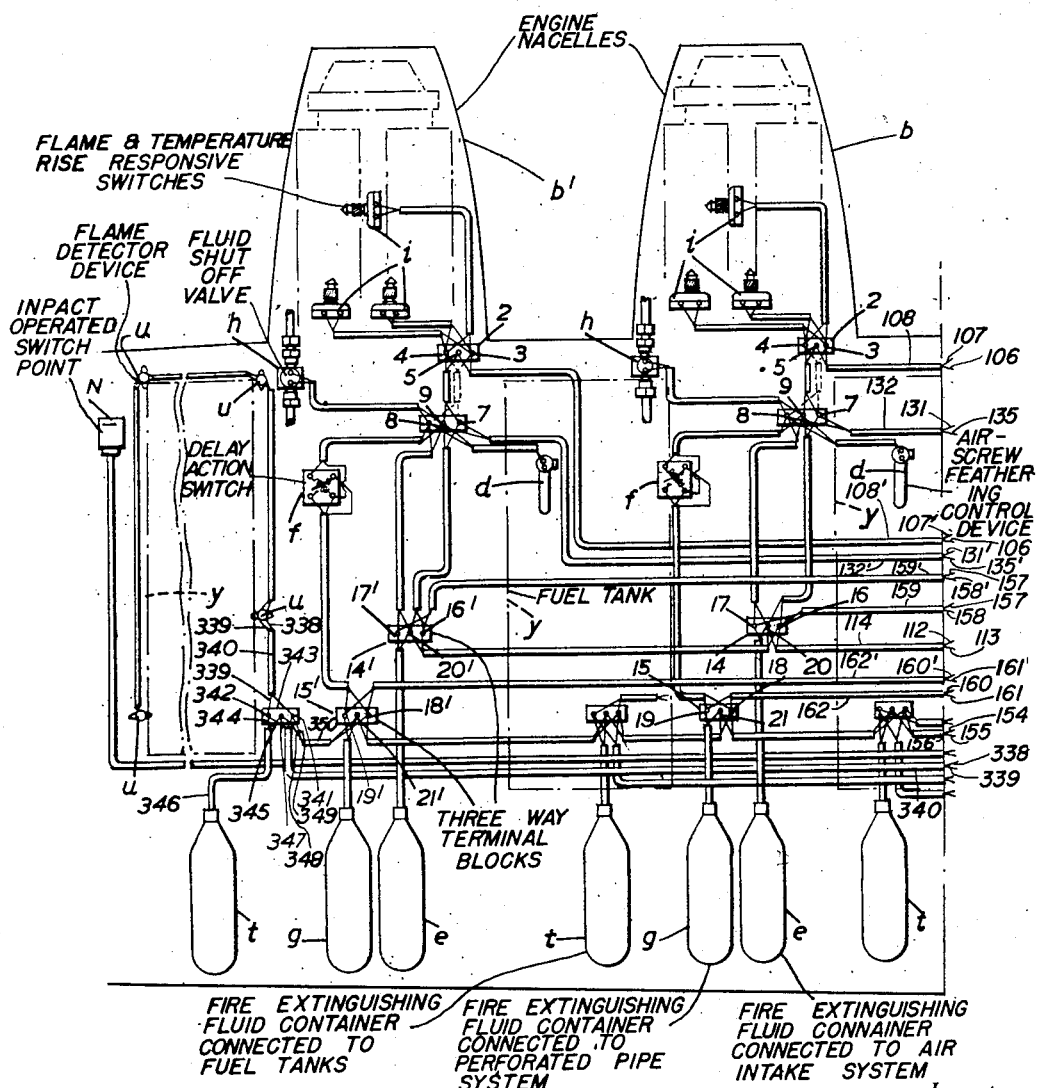

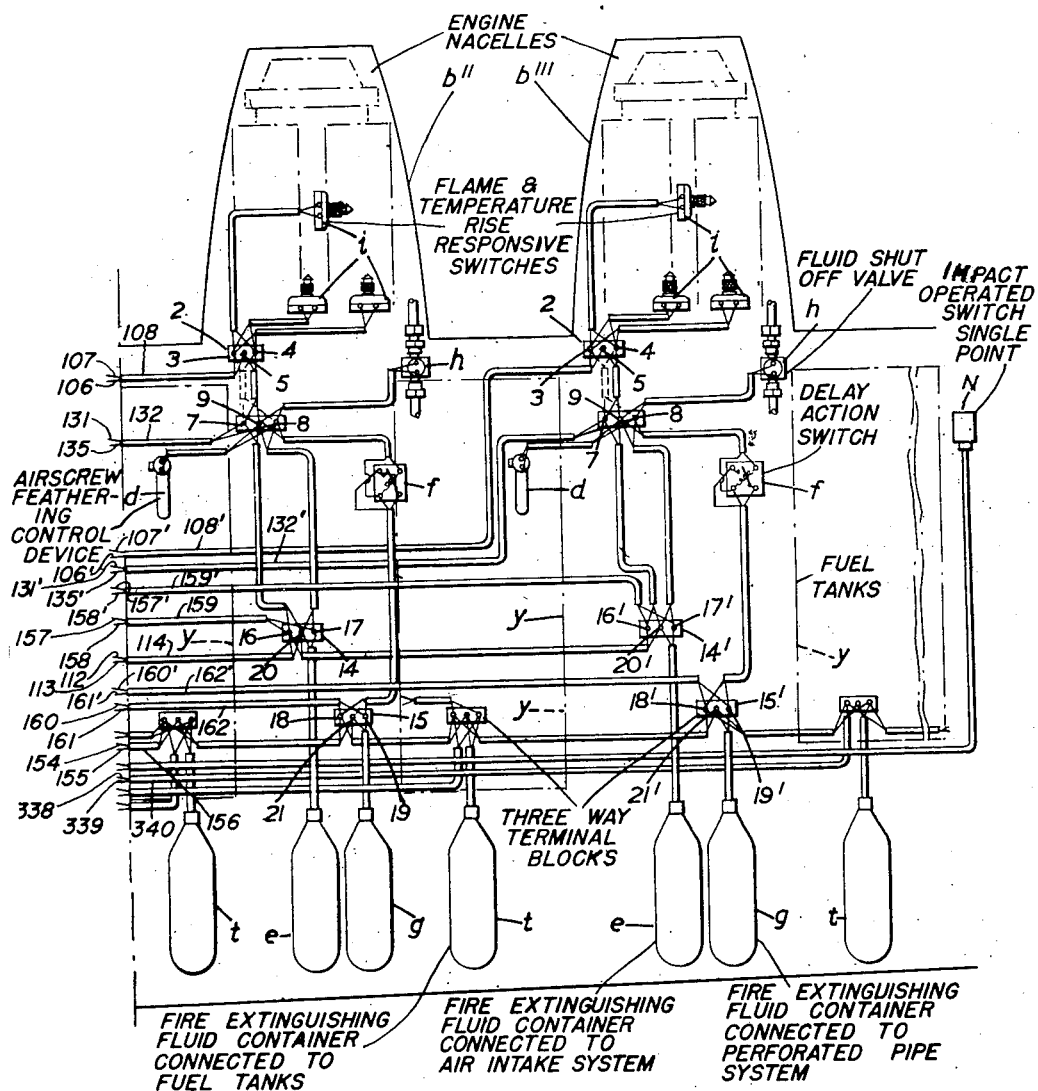

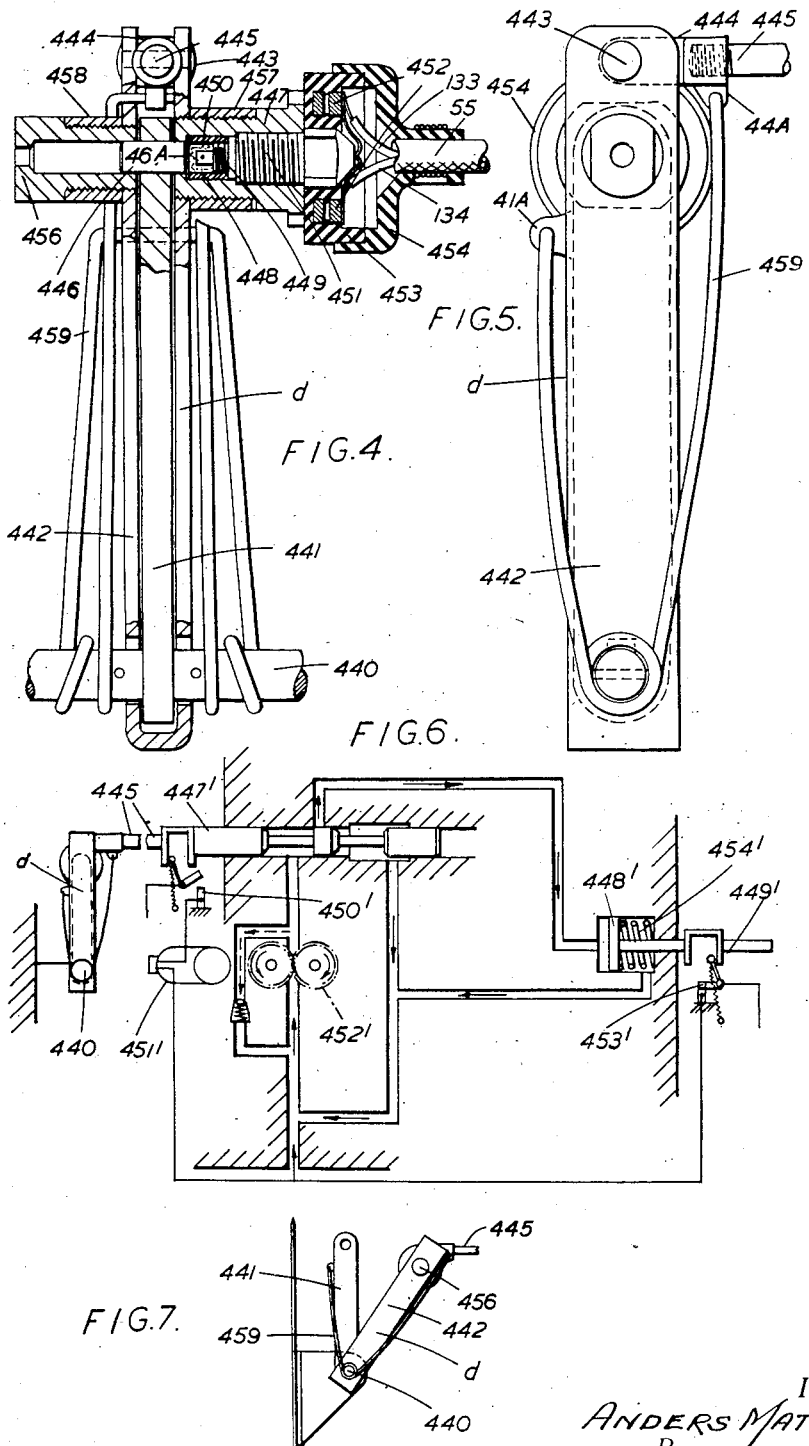

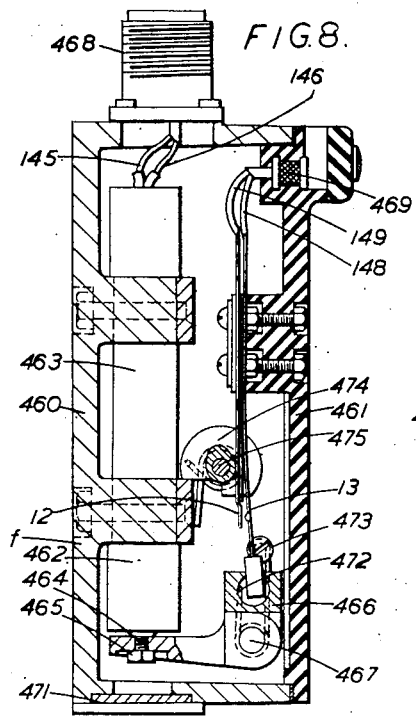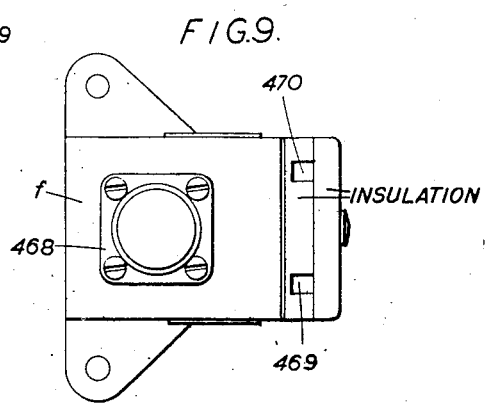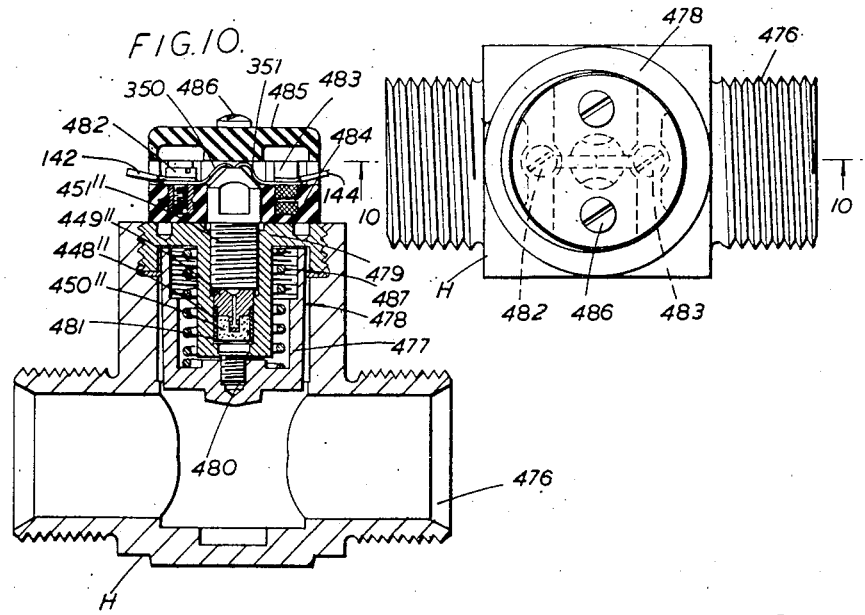

Aug. 28, 1951 A. MATHISEN 2,566,235
FIRE PREVENTING MEANS FOR POWER PLANTS,
PARTICULARLY ON AIRCRAFT
Filed Nov. 30, 1943 16 Sheets-Sheet 13
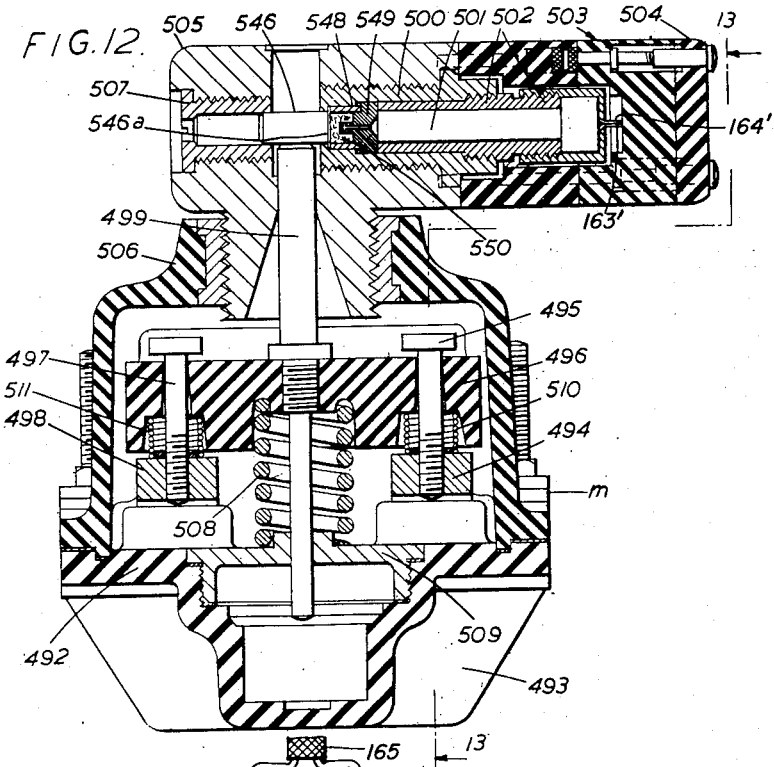
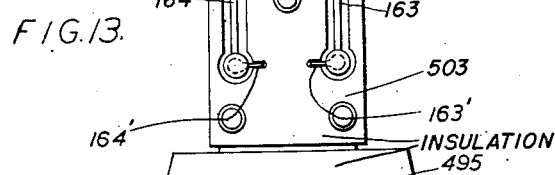
Inventor
ANDERS MATHISEN,
By R. S. Ould
Attorney

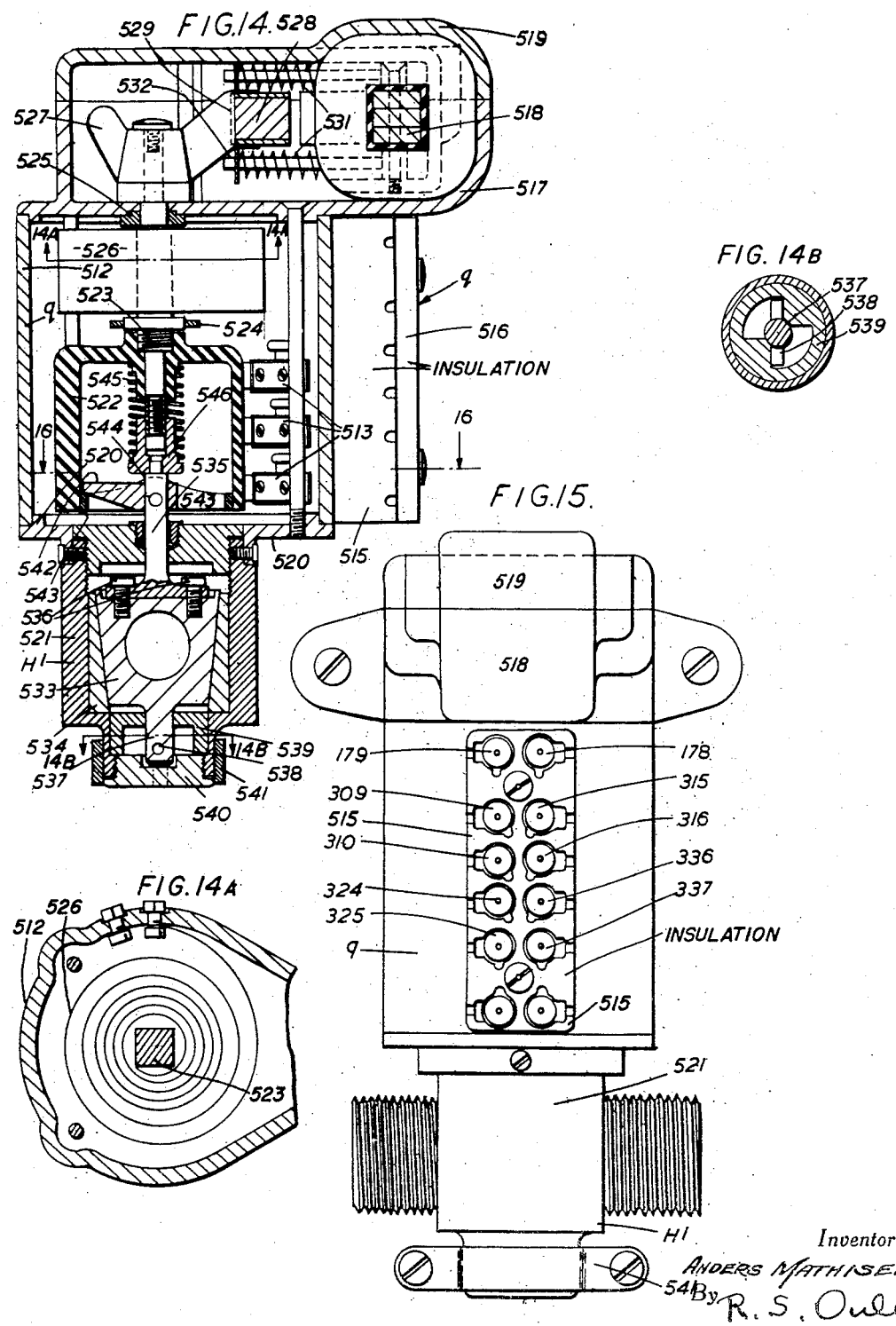

Patented Aug. 28, 1951

2,566,235

UNITED STATES PATENT OFFICE 2,566,235

FIRE PREVENTING MEANS FOR POWER PLANTS, PARTICULARLY ON AIRCRAFT

Anders Mathisen, Isleworth, England, assignor to Graviner Manufacturing Company Limited, Osterley, Isleworth, Middlesex, England, a British corporation Application November 30, 1943, Serial No. 512,364
In Great Britain December 18, 1942

19 Claims. (Cl. 169—2)

This invention relates to improvements in fire preventing and extinguishing means for power plants generally but particularly for power plants on aircraft.

Power plants generally and aero engines in particular are subject to fire risks on account of a variety of causes. Fuel or oil pipes and the like may fracture or receive damage in some way causing leakage of fuel or oil which may be ignited as the result of contact with hot exhaust manifolds and piping. Mechanical defects may develop due to fracture of exhaust or induction manifolds, cracking of cylinder heads, blowing of gaskets and the like, and the result of such defect may be that flames are discharged from the engine causing ignition and burning of any inflammable substance or material in the engine compartment.

Fire-fighting equipment as at present employed on aero engines usually incorporates flame and temperature rise responsive devices controlling automatic fire extinguishers which will discharge their contents into the engine compartment when fire occurs, but experience indicates that if the engine continues to rotate, the fire-extinguishing fluid is rapidly discharged from the engine compartment and the fire is restarted.

It is therefore necessary to stop the engine when a fire occurs, but it has been found that a fire may persist on an engine on certain types of aircraft for a considerable time before the crew discover that the engine is on fire, and while a warning light may be given by the flame switches to the effect that any particular engine is on fire, the pilot will normally be relied upon to carry out a number of sequential operations which, unless they are commenced promptly and carried out rapidly, may fail to have the desired effect, with the result that the fire cannot be coped with.

The present invention consists in fire-fighting equipment for power plants, said equipment comprising in combination one or more fire-extinguishing fluid containers and in combination therewith a control device adapted to effect stoppage of the power plant, and actuating means adapted to effect discharge of said containers and to effect operation of said control device when a fire occurs.

In the case of aircraft power plants it is not sufficient to stop the engine for example by cutting off the ignition, as the air screw will continue to rotate thereby scavenging any fire-extinguishing fluid which may have been injected into the power plant or sprayed thereover, after which a fire will restart.

According, therefore, to the present invention, aircraft power plant fire-fighting equipment comprises in combination, one or more fire-extinguishing fluid containers, means adapted to effect operation of the air-screw feathering mechanism together with control means for stopping combustion in the power plant, and actuating means to effect discharge of said containers, effect operation of said means for feathering the air screw, and for effecting operation of said control means when a fire occurs in flight.

The means for stopping combustion may consist in the usual ignition cut-out switch, or special switch means may be provided for this purpose, but preferably the means for stopping combustion in the power plant comprises a fire-extinguishing fluid container connected to the air and fuel intake system in the power plant which container is adapted to be discharged when the air-screw feathering mechanism is set into operation on occurrence of a fire in flight.

The stopping of a power plant on occurrence of a fire will not in itself generally ensure extinction of the fire, and in combination with the above means for stopping the power plant an additional supply of fire extinguishing fluid is provided which is arranged to be externally sprayed and discharged into the power plant compartment or to be sprayed over the engine, such discharge according to one feature of the invention taking place after a predetermined time lag after initiation of the air-screw feathering mechanism and after cessation of combustion in the power plant, this delayed discharge being effecteed by a delay action switch set in operation by the actuating means which effect operation of the air-screw feathering mechanism and of the means for stopping combustion.

In order that a small quantity of fire-extinguishing fluid may have the maximum effect, it is necessary that discharge be rapid, and a period of two to three seconds is generally adopted as a desirable discharge period. If the fluid is discharged over the power plant while the propeller is rotating at full speed and under power, the fluid may be dispersed and blown away by the air stream. The discharge of the extinguishing fluid through the external spray piping is therefore delayed, in accordance with the present invention, until combustion in the power plant has ceased and until the propeller is in or near its fully feathered position, when rotation will have entirely ceased or have been much reduced.

In order to prevent discharge of fuel, oil and other combustion substances into the power plant compartment after a fire has occurred, shut-off valve devices are provided in the fuel, oil and over substances, conduits or pipes, which devices are operated by said actuating means to close said pipe when a fire occurs.

As will be seen from the above, each power plant is provided with two sources of supply for fire-extinguishing fluid adapted to be discharged at different times when a fire occurs for example, in flight or on the ground, but in the case of a crash it is essential that all the fire-extinguishing fluid should be discharged at the moment of impact with the ground or any obstruction, and to this end aircraft power plant fire-fighting equipment comprising one or more electrically actuated fire-extinguishing fluid containers for each of two or more power plants on an aircraft, incorporates an impact operated switch for effecting discharge of all the said containers simultaneously when the aircraft is subjected to abnormal deceleration, in combination with a control device or means associated with each power plant and adapted to be operated as described above.

While it has been the general practice to connect the leads from the individual terminal blocks of the extinguishers in the individual engines directly to the impact operated switch, difficulties arise upon four-engine aircraft if there are two sets of extinguishers upon each engine requiring individual connections to the impact switch, moreover in some cases the fuel tanks may require to be provided with fire extinguishers and as there may be as many as six fuel tanks upon a large aircraft which also require individual connections upon the impact switch it is proposed in accordance with one feature of the present invention to provide a multi-point contact switch or relay in a central position of the aircraft fuselage or hull to which the leads from the various engine and fuel tank extinguishers can be connected by cables of the shortest possible length, said switch or relay being then operated electrically by a single pair of contacts in an impact switch having a simplified form of terminal arrangement.

The above arrangement becomes more especially desirable if the fuselage or hull of the aircraft is large because it is a requirement that the impact operated switch should be mounted forward in the fuselage or hull and in a low position, and this will therefore involve considerable length of cabling, which can be saved by the provision of a multi-point contact switch or relay disposed in a central position in the fuselage or hull, a single lead leading from this appliance to the impact switch being disposed in the appropriate position.

Furthermore it has been found that large aircraft particularly of the four-engine type are likely to dip their wings into the ground during landing operations, and in some cases such accidents result in the wing tanks and the engines in the wings catching fire on striking the ground before the fuselage strikes the ground, whereby operation of the impact switch might be effected.

Accordingly an impact switch of the single point type may be mounted in each of the wings preferably in a position between the wing tips and the outer engines, said switches being connected by a single lead to the multi-point contact crash or other switch or relay, whereby actuation of all the fire extinguishers and associated equipment will be effected in a cash in which a wing tip strikes the ground before the fuselage or hull of the aircraft.

It has been found desirable to ensure disconnection of the electrical leads from the aircraft storage battery or accumulator or supply source when a crash occurs, and means adapted to be actuated by an impact operated device have been proposed for disconnecting the leads from the accumulator on an aircraft in a crash, but it is necessary to ensure that the various fire-extinguishing fluid containers are electrically actuated to discharge before the electrical supply source is disconnected. The means for disconnecting the leads from the accumulator are therefore adapted to operate after a slight time lag after the crash has occurred, when incorporated in fire-fighting equipment comprising appliances as described above.

The above described appliances may be operated in a fully automatic manner by one or more flame and temperature-rise responsive electrical switch devices associated with the power plants by providing that these electrical switch devices effect direct operation of the said appliances.

Under certain circumstances, such as for example during take-off, it may not be advisable for the fully automatic fire fighting equipment to effect stoppage of the engine if a minor fire occurs, and in that case means may be provided for transmitting a visible or audible warning signal to the pilot or other aircraft personnel member indicating which power plant or engine is on fire. A single manually operated control switch is then provided in the personnel compartment for operation by the pilot or personnel member for the purpose of operating the above mentioned appliances, the system being in this case therefore semi-automatic.

Alternatively, control means may be provided for rendering the above appliances inoperative during take-off or landing operations while at the same time the system remains capable of actuation by the impact-operated switch.

While the above appliances have been described as individual and separate devices, it may under certain circumstances be desirable to incorporate the same in a single engine control unit device constructed as follows:

The control unit device may in accordance with this feature of the invention embody a plurality of electrical switch contacts, one pair of which is adapted to effect discharge of fire-extinguishing fluid into the power plant when a fire occurs. A second pair of contacts is at the same time adapted to initiate feathering operation of the air screw.

Alternatively one pair of contacts may be adapted to shut off the ignition system of the power plant, but normally the control unit device will comprise sufficient pairs of electrical contacts for effecting stoppage of the engine, initiating feathering operation of the air screw, and for initiating operation of a delay action switch which after a predetermined time lag effects discharge of fire-extinguishing fluid over the power plant, in addition to which one or more fluid shut-off valves may be incorporated in the device.

The above described control unit comprises a movable contact actuator 522 (Fig. 14) adapted to open and close electrical contacts, a member 535 adapted to open and close fluid cock or valve devices, and an operating member 523 held for example against spring tension, this being capable of release by electrical energisation or ignition of a holding member which on operation from the flame and temperature rise responsive flame switches or a manual control switch permits release of the movable members to effect the necessary circuit changes and to shut off the fluid cock or valve device or devices.

The invention will now be described with reference to the accompanying drawings which show embodiments of the invention by way of example and in which:

Figure 1A is a central portion of an electrical circuit diagram of a fire-fighting system for a four-engined aircraft.

Figure 1C is a starboard portion.

Figure 2 is a condensed diagram of the devices and connections applicable to a single nacelle and engine, using an electrically actuated combined multi-contact switch and fuel valve unit.

Figure 3 is a condensed diagram of the devices and connections applicable to a single nacelle and engine using an arrangement similar to that shown in Figure 1 with the addition of control means for controlling the release of a fire extinguishing spray around the fuel tanks of the craft.

Figure 3A is a central portion of a further modification of the circuit diagram shown in Figure 1A providing additional fire-extinguishers for the fuel tanks.

Figure 3B is the port portion of Figure 3.

Figure 3C is the starboard portion of Figure 3.

Figure 4 is a view in partial section of an appliance for actuating the air-screw feathering mechanism.

Figure 5 is a side view of Figure 4.

Figure 6 is a view to a reduced scale of the mechanism shown in Figures 4 and 5 and in normal position and a diagrammatic representation of the associated air-screw control apparatus.

Figure 7 is a view of the mechanism shown in Figures 4 and 5 to a reduced scale and shown in the operated position.

Figure 8 is a sectional view of a delay action switch for controlling the discharge of the auxiliary fire-extinguishing tank.

Figure 9 is a plan view of Figure 8.

Figure 10 is a sectional view of a fluid shut-off cock or valve device.

Figure 11 is a plan view of Figure 10.

Figure 12 is a sectional view of an accumulator cut-out switch in normal closed position.

Figure 13 is a view taken on line 13—13 of Figure 12 showing the switch in the circuit opening position.

Figure 14 is a sectional view of an engine control unit device as employed in the arrangement of Figure 2.

Figure 14A is a sectional view taken on the line A—A of Figure 14.

Figure 14B is a sectional view taken on the line B—B of Figure 14.

Figure 15 is a side view of Figure 14 with the cover plate removed.

Referring now to Figures 1, 1A, 1B and 1C, $a$ denotes an aircraft fuselage and $b$, $b'$, $b''$, $b'''$ denote power plant or engine nacelles, $c$ denoting a standard aircraft accumulator or storage battery.

Figure 1:
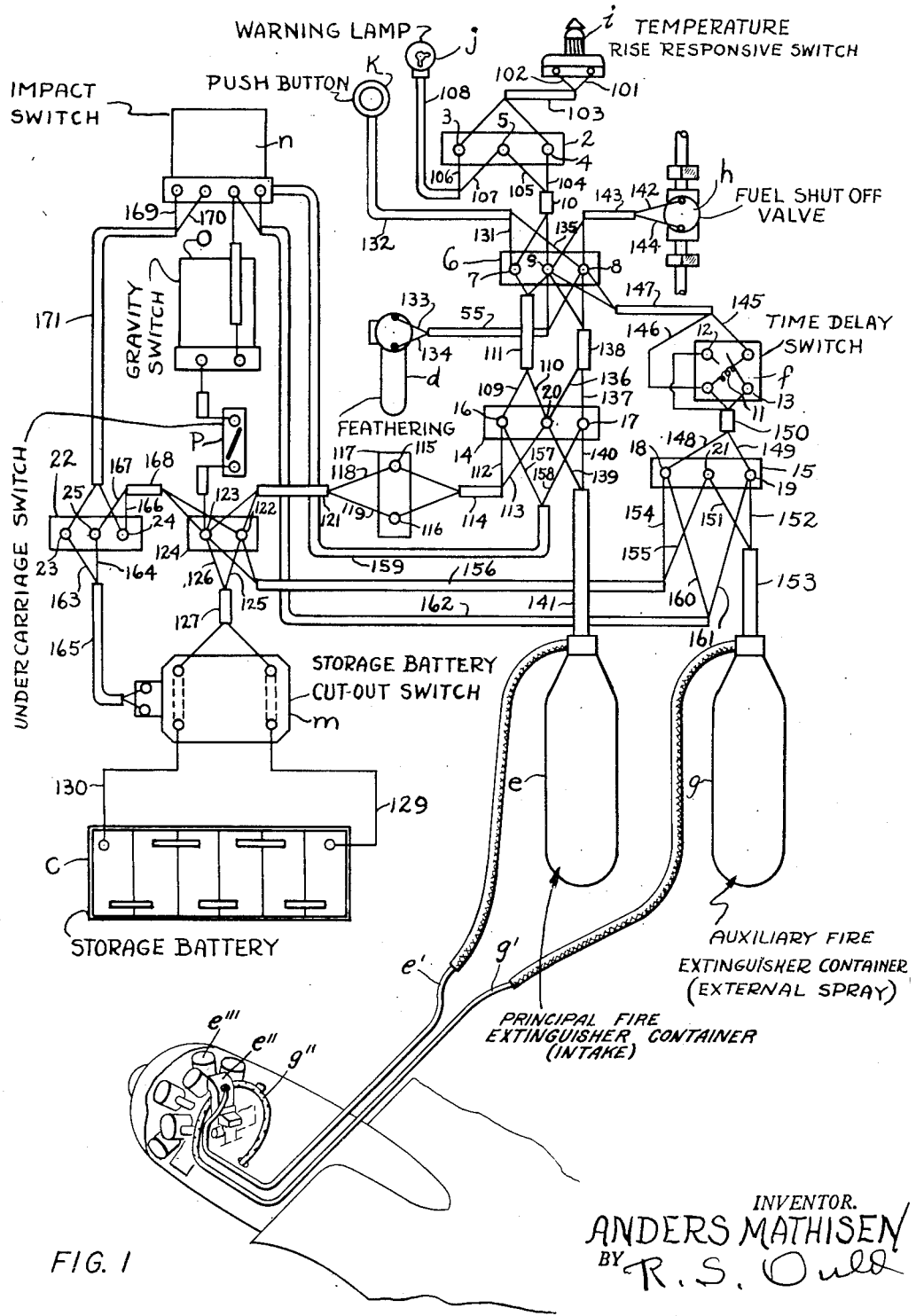
Figure 1 is a condensed diagram of the devices and connections applicable to a single nacelle and engine.

$d$ denotes an air-screw feathering mechanism control device, shown in detail in Figures 4 to 7, and $e$ denotes principal fire-extinguishing fluid containers adapted to be connected by metallic or the like piping $e'$ to the air and fuel intake system $e''$ on the power plant $e'''$ as shown in Figure 1.

$f$ denotes a delay action switch, of which details are shown in Figures 8 and 9, and $g$ denotes auxiliary external spray fire-extinguishing fluid containers adapted to be connected by metallic or the like piping $g'$ to perforated spray piping $g''$ distributed over an engine $c'''$.

$h$ denotes a fuel shut-off valve shown in Figures 10 and 11, $i$ or $i'$ denote flame and temperature rise responsive switch devices of a known type, and $j$ or $j'$ denote fire warning lamps in a personnel compartment in the fuselage $a$, while $k$ or $k'$ denote manually operated electric switch devices of a known type also positioned in the personnel compartment. The lamps $j$ or $j'$ and switch $k$ or $k'$ connected to the fire-fighting appliances in a particular engine compartment or nacelle $b$ are arranged adjacent to one another so that personnel members will know which electric switch to operate when a fire warning is received. The various lamps $j$ or $j'$ and switches $k$ or $k'$ connected to the various engine nacelles $b$ are arranged in the personnel compartment in positions which will indicate to the personnel which engine is on fire, as will be clear from the circuit diagram.

$m$ denotes an accumulator cut-out switch, constructional details of which are shown in Figures 12 and 13, $n$ denotes an impact operated switch of known type as described for instance in U. S. Patent No. 2,236,959, and $o$ denotes a gravity operated switch of known type as described for instance in U. S. Patent No. 2,353,764, and $p$ denotes a retractable undercarriage control switch adapted to disconnect switch $o$ from the aircraft accumulator $c$ when the retractable undercarriage of the aircraft is in the up position. The impact operated switch is responsive to sudden violent impact applied to the craft. The gravity operated switch is responsive to inversion of the craft if it occurs slowly, or to its rotation through a determined angle, as 90 degrees.

When a fire occurs in one of the engines in a nacelle $b$, one or other of the flame and temperature rise switch devices $i$ operates to bridge the ends of conductors 101, 102, of a cable 103, which are connected to the outer terminals 3, 4 of a three-way terminal block 2. The block 2 is provided with a central terminal 5.

To the terminals 3, 5 (Fig. 1A) are connected the conductors 106, 107, of a cable 108, connected to one of the lamps $j$.

To the terminals 4, 5 of the block 2 are connected electric current supply leads 104, 105 of a cable 10, which are connected to the terminals 7, 9 of a second three-way block 6 provided with a third terminal 8.

To the terminals 7, 9 of the block 6 are connected the conductors 109, 110, of a cable 111, which are also connected to terminals 19, 20 of a third three-way block 14, provided with a third terminal 17.

To the terminals 16, 20 are also connected the conductors 112, 113 of a cable 114, which are also connected to the terminals 115, 116 of a terminal block 117 (Fig. 1).

To the terminals 115, 116 are connected the conductors 118, 119 of a cable 121, which are also connected to the terminals 122, 123 of a terminal block 124.

To the terminals 122, 123 are connected the conductors 125, 126, of a cable 127, which are connected to the accumulator switch $m$ which, in turn is connected by the conductors 130, 129 to the standard aircraft accumulator $c$.

The other flame and temperature-rise responsive switch devices $i$ in the nacelle $b$ are connected to the terminals 3, 4 of the block 2 in the manner above described.

With the arrangement so far described it will thus be seen that when the accumulator cut-out switch $m$ is closed the lamp $j$ will be illuminated when any one of the devices $i$ is actuated as a result of fire or increase in temperature, this giving a visible warning to a person in the aircraft fuselage $a$ who will then close the switch $k$.

In the nacelle $b'$ the flame and temperature-rise responsive devices $i'$ are connected to the corresponding lamp $j'$ and to the block 14' in the same manner as the devices $i$ of the nacelle $b$ are connected to the block 14.

The conductors 112', 113' of the cable 114', are connected to the terminals 16', 20' of the block 14' and to the terminals 16, 20 of the block 14 and thus to the accumulator $c$ as above described.

In the nacelles $b''$ and $b'''$ the arrangements are identical with those described respectively with reference to nacelles $b$ and $b'$.

By closure of the manually operable switch $k$, a circuit is closed through the conductor 131, of the cable 132, terminal 7, (Fig. 1A) conductor 133 to the accumulator $c$ and back to the conductor 110 as above described, terminal 9, conductor 133, of cable 55, the screw-feathering mechanism control device $d$, conductor 134 of cable 55, terminal 8, and conductor 135 of cable 132.

To the terminals 8, 9, are also connected the conductors 136, 137, of a cable 138 (Fig. 1A), which are also connected to the terminals 20, 17 of the block 14. To the terminals 20, 17 are also connected the conductors 139, 140 of a cable 141 connected to the principal fire-extinguishing fluid container $e$ so that this is caused to discharge its contents on the fire in the air and fuel intake system of nacelle $b$ by changing connections on block 2 to the several devices $d$, $e$, $f$, $h$.

When closing the manually operable switch $k$, a circuit is also closed from the terminal 7 to the accumulator $c$ and back to the terminal 9, as above described, the conductor 142, of the cable 143, to the fluid shut-off valve $h$, and conductor 144, of cable 143, terminal 8.

A further circuit is closed in parallel with the circuit of the air-screw feathering control device $d$, from the terminals 8, 9, conductors 145, 146, of cable 147, through the delay action switch $f$, incorporating an electrically energised fuse 11, which initiates burning of a delay action igniter, hereinafter described.

The delay action igniter of switch $f$, after a predetermined time lag, effects operation and closure of a pair of contacts 12, 13, whereby the following circuit is closed: conductors 148, 149, of cable 150, terminals 18, 19 of three-way terminal block 15, conductors 151, 152 of cable 153, connected to terminals 19, 21 and the auxiliary external spray fire-extinguishing fluid container $g$, conductors 154, 155, of cable 156, connected to terminals 21, 18 and to terminals 123, 122 connected to the accumulator $c$ as above described.

By means of this circuit, electrical release of the auxiliary external spray fire-extinguishing fluid container $g$ is effected after a predetermined time lag.

When the devices $d$, $e$, $f$, $h$ are to be operated automatically, when one of the temperative responsive switch devices $i$ is closed, the cable 10 (Fig. 1B) is arranged as shown in broken lines at 10', that is to say the conductor 104' is connected to the terminals 3 and 7, and the conductor 105' to the terminals 4 and 8. With this arrangement the devices $d$, $e$, $f$ and $h$ are operated automatically, without the use of the manually operable switch $k$ on the occurrence of a fire in the nacelle $b$.

The devices $d$, $e$, $f$ and $h$ in the nacelle $b'$ are operated in a similar manner as described in connection with the nacelle $b$, the only difference being that in connection with nacelle $b'$, the conductors 154' and 155' of cable 156', are connected respectively to the terminals 21' and 18' of the block 15' and to the terminals 21, 18, of the block 15 and conductors 112' and 113' of cable 114' are connected respectively to the terminals 16' and 20' of the block 14' and the terminals 16 and 20 of block 14 for completing the circuit to the accumulator $c$.

The arrangement of the devices $d$, $e$, $f$ and $h$ in the nacelle $b''$ is the same as that above described in connection with nacelle $b$, while that in the nacelle $b'''$ is the same as that in nacelle $b'$.

In the fuselage $a$ is provided the known type of impact operated switch $n$ which incorporates a plurality of pairs of contacts which are operated to close when the aircraft is subjected to abnormal deceleration. Pairs of contacts from impact switch $n$ are connected by the conductors 157, 158 of a cable 159 to the terminals 16, 17 of the block 14, from switch $n$ through the conductors 157', 158' of cable 159' to the terminals 16', 17' of the block 14', from switch $n$ through the conductors 160, 161 of the cable 162, to the terminals 18, 19 of the block 15, and from switch $n$ through the conductors 160', 161' of cable 162' to the terminals 18', 19' of the block 15'. Electrical current supply is connected to terminals 16, 20, 16', 20', 18, 21, 18', 21' as above described, and the fire extinguishing fluid containers $e$ and $g$ are respectively connected to terminals 17, 20, 17', 20' and to terminals 19, 21, 19', 21', so that upon closure of pairs of contacts in impact switch $n$, the fire extinguishing fluid containers $e$ and $g$ are all operated instantaneously in the case of a crash.

The delay action fuse device in the accumulator cut-out switch $m$ will be further described with reference to Figures 12 and 13. As shown the accumulator cut-out switch $m$ is connected to a three-way terminal block 22 having outer terminals 23 and 24 and a central terminal 25. The conductors 163, 164 of a cable 165 from the fuse in this switch $m$ are connected to terminals 23 and 25, of block 22, electrical current supply being connected to terminals 24 and 25 by the conductors 166, 167 of a cable 168, connected to the terminals 122, 123, of block 124, so that upon closure of a pair of contacts in impact switch n connected by the conductors 169, 170 of a cable 171 to terminals 23 and 24 of block 22, energisation of the fuse in accumulator cut-out switch m will take place.

Figure 1B:
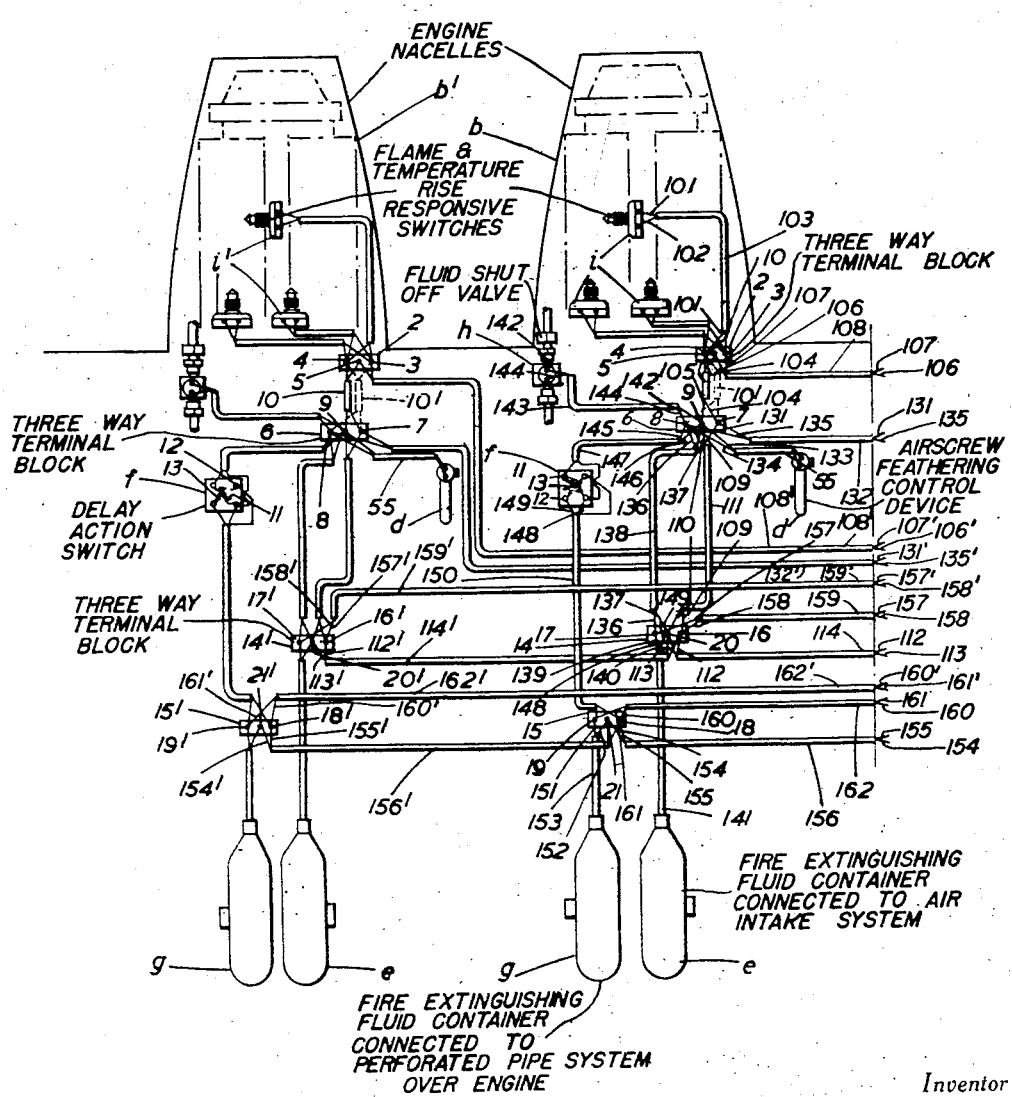
Figure 1B is a port portion.
Figure 2A:
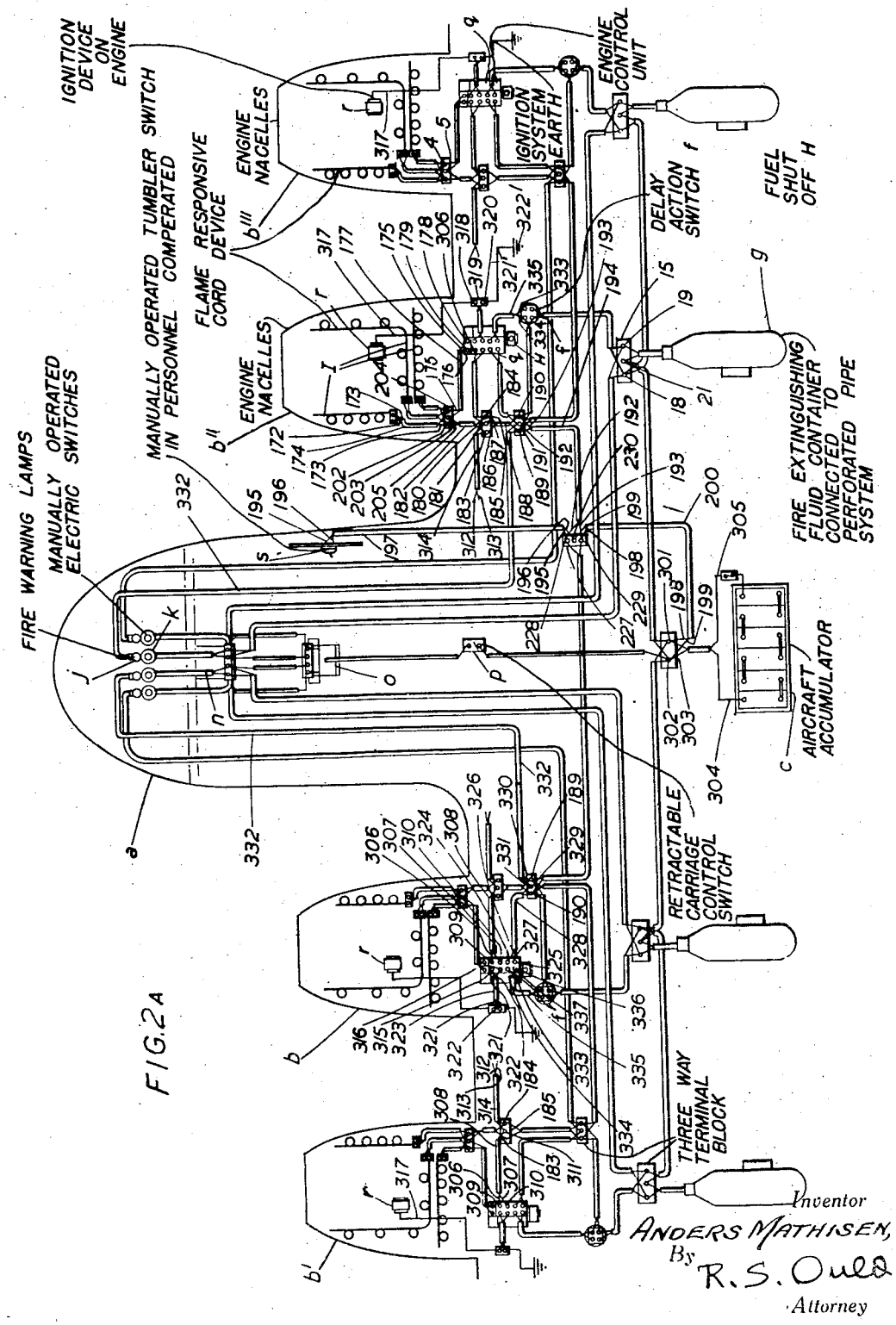
Figure 2A is a similar circuit diagram showing certain modifications from the system shown in Figure 1 with full automatic operation by individual control units for each engine.
Figure 16:
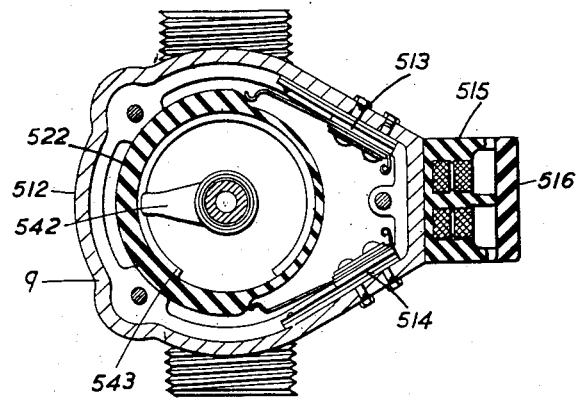
Figure 16 is a view on line 16—16 of Figure 14.

Referring now to the electrical circuit diagram shown in Figure 2, the various reference letters and numerals corresponding to those on Figures 1, 1A, 1B and 1C denote identical parts but the circuit incorporates the following modifications.

While the system may be arranged for semi-automatic operation, it is shown on the drawing arranged for fully automatic operation in that the electrically energised control device in the engine control unit device denoted q, (Fig. 2) while will be more fully described with reference to Figures 14, 14A, 14B, 15, 16, and 17, is energized directly from flame and temperature-rise responsive devices I of a type different from that shown in Figures 1, 1A and 1B, but arranged to close a pair of electrical contacts when a fire occurs in the engine compartment. Individual engine control devices q are provided for each nacelle, but the operation of devices q for nacelle b'' will be described as representative.

The conductors 172, 173 of cable 174 from flame and temperature rise responsive switch devices I are connected to outer terminals 203 and 204 upon terminal block 202, whereby energisation of the operating head of device q takes place upon operation of any one of the devices I through conductors 175, 176 of cable 177, connected to the terminals 204, 205 and operating head terminals 178, 179 of the device q, conductors 180, 181, of cable 182, connected to terminals 205, 203 of block 202 and to terminals 183, 184 of block 185, conductors 186, 187 of cable 188 connected to terminals 183, 184, and to terminals 189, 190 of block 191, conductors 192, 193 of cable 194 connected to terminals 189, 190 and to terminals 228, 229 of block 227, conductors 195, 196 of cable 197 connected to terminals 228, 230 of block 227 and to manually operable switch s, in the battery supply line, which can be opened during take-off, conductors 198, 199 of cable 200 connected to terminals 301, 302 of block 303, and conductors 304, 305 connected to terminals 301, 302 of block 303 and to opposite poles of the accumulator c.

Energisation of the operating head of device q effects closure of a plurality of switch contacts, one pair of which will effect energization of the air screw feathering motor control switch, it being assumed that the air screw is of the electrically operated type. This motor is not shown on the drawing, but the conductors 306, 307 of a cable 308, lead from the terminals 309, 310 on the device q to terminals 184, 311 of the block 185, while conductors 312, 313 of a cable 314 lead from these last mentioned terminals to the control switch of the air screw feathering motor.

Another pair of contacts in control device q will close to cut out or ground the ignition system indicated generally by r. For this purpose the ignition system r is connected by the lead 317 to terminal 318 of a block 319 of which terminal 320 is connected by lead 321' to earth 322', the terminals 318, 320, being connected by conductors 321, 322 of cable 323, to the terminals 315, 316 of device q. A further pair of contacts close to energise lamp j. The circuit for this purpose is as follows: terminals 324, 325 of device q, conductors 326, 327, of cable 328, connected to these terminals and to terminals 190, 329 of block 191 and conductors 330, 331, of cable 332, connected to terminals 329, 189 of block 191 and to the lamp j. An additional pair of contacts close to energise the fuse in the delay action switch f. The switch f is connected by conductors 333, 334 of cable 335, to terminals 336, 337 of device q. The delay action switch f is connected to the external spray fire-extinguishing supply source g in the manner above described with reference to Figure 1A. The external spray source g is also arranged to be controlled by the manual switch k as above described with reference to Figure 1A.

Operation of device q furthermore serves to effect direct mechanical closure of fluid cock or valve device H (Figs. 2 and 14) thereby shutting off fuel, oil or other combustible fluid to the engine compartment when a fire occurs as described with reference to Figures 14 and 15. The fuse of the delay action switch f may be energised when the contacts 336 and 337 of the control unit q are closed inasmuch as the cable 375 is connected between the delay action switch f and the terminal block 191, the terminal block 191 being connected to the storage battery C as shown in Figure 2.

In the arrangement of Figure 2, only one fire-extinguishing fluid supply source is provided for each engine as indicated in the drawing, this being the external spray container g which is operated by the delay action switch f by means of a a twin cable connected to terminals 19 and 21 on terminal block 15, a twin cable being also in this case connected to terminals 18 and 19 on terminal block 15 from impact operated switch n as described above with reference to Figures 1, 1A and 1B, so that in a crash, discharge of external spray container g will occur instantaneously through the spray pipe g'' which is connected to the container g by the tubing g'.

The system arranged as has been described for Figure 2 will operate fully automatically. However, it may be found desirable to change it so that it will operate semi-automatically under manual control, and to accomplish this, there is provided in the personnel compartment means comprising the normally closed manually operable switch s which controls the electric current supply to the engine control unit device q by means of terminal block 227 which is provided with outer terminals 228 and 229 and central terminal 230.

Electric current supply is connected by a twin cable from the accumulator c to terminals 229 and 230, whereas twin cable leads are connected from switch s to terminals 228 and 230 so that current is supplied from terminals 228 and 229 only when switch s is closed, the current supply to control appliances q and associated appliances being taken from terminals 228 and 229 as above described.

As it may not be desired to feather the air screw, and shut off the ignition and fuel supply to the engine, even if a fire occurs during take-off, the personnel may open cut-out switch s during take-off, and as will be seen manually operable switch k is connected to terminals 18 and 19, so that, as described with reference to Figures 1, 1A, 1B and 1C, the discharge of the extinguisher g can be effected if a fire should occur during taking-off operations, such discharge not normally affecting the running of the engine unless fire extinguishing fluid is injected into the air and fuel intake system of the engine, which is not the case with the system described and shown in Figure 2.

It will be understood that the same operations take place in the nacelles $b$, $b'$ and $b'''$ as described in connection with nacelle $b''$.

Referring to the further modified form shown in Figures 3, 3A, 3B, the system shown in Figures 3, 3A, 3B and 3C incorporates practically the same equipment as the system shown in Figures 1, 1A, 1B and 1C, but additional fire-extinguisher fluid containers $t$ are provided for the fuel tanks $y$ upon the aircraft, to which they are connected by means of spray piping $y'$ as shown in Figure 3, these extinguishers being operable by flame detectors $u$ disposed adjacent the fuel tanks $y$ and normally mounted on the walls of the fuel tank compartments so as to detect flames which may occur if a fuel tank $y$ catches fire due for example to ignition of fuel leaking from the tank.

As it is desirable that all fire extinguishers associated with the engine and with the fuel tanks $y$ should be discharged simultaneously in a crash, it is necessary that the extinguishers associated with the fuel tanks $y$ in each wing should be connected to a separate pair of contacts upon the impact operated switch, and as this is generally mounted forward in the fuselage, a considerable saving in cable can be effected by providing a multi-point contact or relay device $v$, which device is mounted centrally in the fuselage or hull of the aircraft in line with the cables or connections extending to the engine bay and to the fuel tank extinguishers.

Figure 18:
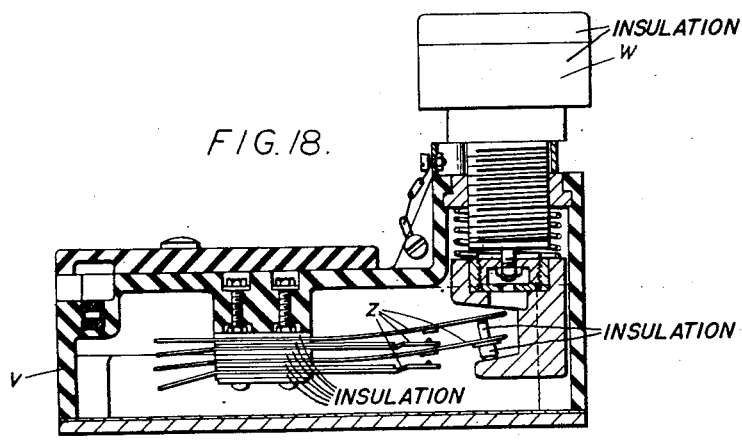
Figure 18 is a sectional view of a central relay or multi-point contact type of switch.
Figure 19:
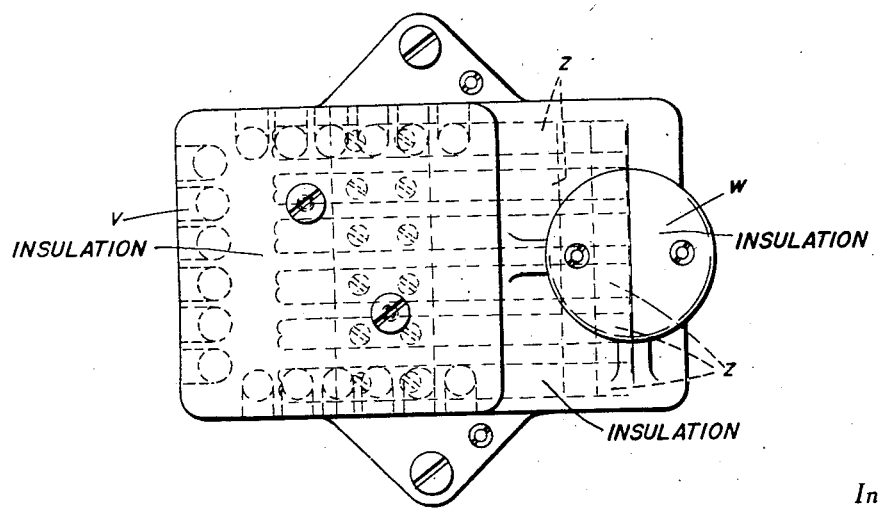
Figure 19 is a plan view of the switch shown in Figure 18.

One such form of multi-point contact switch or relay is shown in Figures 18 and 19 and incorporates an electrically operated cartridge device of head $w$ which upon ignition from any electrical source effects closure of contacts $z$ which effect discharge of all the extinguishers $e$, $g$, $t$ and operation of accumulator cut-out switch $m$ in a crash.

An impact operated switch N identical with principal fuselage switch $n$ (Figs. 1 and 2) except that it is only provided with a single pair of contacts and a single terminal block, is mounted forward in the lower portion of the fuselage as shown in the drawing (Fig. 3).

In the case of very large multi-engine aircraft it is found that there is a risk of the wing tips striking the ground before the fuselage during a bad landing, and it has been found that the engines on the wing which strike the ground and the fuel tanks mounted in this wing may catch fire on striking the ground before the fuselage strikes the ground, and before principal fuselage impact switch $n$ is operated, and additional auxiliary impact switches N are (Figs. 3A, 3B) therefore mounted in the wings at a point between the wing tip and the outer engine as shown on the drawing (Figs. 3A, 3B) in which position the appropriate switch will receive an impact if a wing tip strikes the ground and the switch will therefore effect operation of multi-point contact switch or relay $v$ at the moment of impact of the wing tip with the ground.

By way of example the circuit of the flame detectors $u$ for the tank $y$ at the left hand of Figure 3A will now be described, it being understood that the circuits of the flame detectors $u$ at the right hand end of Figure 3B and the nacelles $b$, $b'$, $b''$, $b'''$, are arranged in a similar manner. From the flame detectors $u$, conductors 338, 339, of a cable 340, lead to and are connected to terminals 341, 342 of block 343.

The container $t$ is connected by conductors 344, 345, of cable 346, to terminals 342, 347, of block 343, while conductors 348, 349, of cable 350, are connected to terminals 347, 341 of block 343 and to terminals 21', 18' of block 15' and thus to the relay $v$.

Referring now to Figures 4, 5, 6 and 7 the air screw feathering device $d$ is mounted upon a control rod 440 provided with a fixed crank 441. A U-shaped lever device 442 is rotatably mounted on rod 440 and is provided with a securing pin or rivet 443 on which an eyelet fitting 444, engaging an air screw control mechanism operating rod 445, is mounted.

Crank 441 and lever 442 are normally locked together by pin 446 secured in a cartridge fitting 447 by a narrow rim 46A. The fitting 447 is bored out and provided with a sleeve 448 fitted with an igniter fitting 449 and filled with a small quantity of explosive substance 450. The parts 446, 447, 448 and 449 are secured by a fuse holder 451 in fitting 447, said fuse holder containing a known type of electrically ignited fuse having leads extending to terminals 452, in terminal block device 453, provided with a cable holding terminal block cap 454 which secures cable 55 by which energising current can be supplied, by conductors 133, 134, to the fuse to cause the explosive substance 450 to project the pin 446 from engagement with crank 441 and lever 442. A cap device 456 is provided for trapping the blown out pin 446.

As will be seen, cartridge fitting 447 is screwed into a welded-on tubular projection 457 projecting from one side of lever 442, cap 456 being similarly secured in a tubular projection 458 welded to the other side of lever 442.

As will be understood, the control devices for the air-screw feathering mechanism are actuated normally by the pilot or aircraft personnel member by actuation of rod 440, crank 441, and lever 442 but when a fire occurs the fuse in holder 451 is ignited by current through cable 55 to displace pin 446, whereby spring 459 displaces lever 442 and thus device $d$ into the relative position with respect to crank 441 as shown in Figure 7 thereby actuating the air-screw control device. Spring 459 engages a lug 41A on crank 441 and a lug 44A on eyelet fitting 444, a number of convolutions of spring 459 being wound on rod 440 on either side of lever 442, the spring being of suitable dimensions and size to ensure actuation of the air-screw feathering control mechanism when pin 446 is blown out.

The air-screw feathering control mechanism may be of any type, but that shown in Figure 6 comprises a hydraulic valve 447' which upon actuation of the mechanism of Figures 4 and 5 into the position shown in Figure 7, is moved into a position in which liquid can be supplied to piston 448', which by movement of rod 449' effects rotation of the air-screw into the fully feathered position in known manner. Upon movement of valve 447', switch 450' is closed to energize motor 451' which actuates pump 452' which pumps oil into the cylinder containing piston 448', thus causing movement thereof against the action of return spring 454'. When piston 448' and rod 449' has rotated the air-screw into the fully feathered position, switch 453' in the circuit of motor 451' is tripped causing the motor 451' to stop, the air-screw being then locked in the fully feathered position until the mechanism of Figures 4 and 5 is restored to normal position during overhaul of the engine necessitated by the fire.

Figures 8 and 9 show details of the delay action switch $f$ for the external spray extinguisher $g$, this comprising a casing 460 provided with a cover 461. A cartridge device somewhat similar in construction to device 447 for the air-screw feathering (Fig. 4) and denoted 462 is mounted in casing 460, the fuse in fuse holder 463 being longer than the fuse in fuse holder 451 (Fig. 4), so that ignition of the explosive substance in the end of the fuse takes place approximately 12 to 15 seconds after energizing current is supplied to fuse wire (see Fig. 1A) 11. A flanged pin 464 provided with a nut 465 is then blown out to cause rotation of a contact actuator 466 rotatably mounted on a spindle 467, whereby closure of contacts 12 and 13 is effected.

Electrical connection to the fuse wire in fuse holder 463 is provided by means of a known type of plug-in device 468, and electrical connection to contacts 12 and 13 is similarly effected by leads 148, 149 connected to the terminals 469 and 470.

To permit escape of products of combustion from casing 460, a removable disc 471 is fitted against an orifice in the casing, this blowing out when the explosion occurs. To ensure reliable closure of contacts 12 and 13, contact actuator 466 is provided with a spring 472, one end of which engages the contact actuator, the other end being secured to a stud 473 in casing 460.

In order to facilitate testing of contacts 12 and 13, an oval shaped cam 474 mounted on the spring urged spindle 475 is provided in casing 460, said spindle projecting slightly outside the side of casing 460, where it is provided with a screw driver slot, so that cam 474 can be rotated to force spring 12 into contact with spring 13, the cam being automatically restored to normal position by spring action upon release of the spindle.

Referring now to Figures 10 and 11 showing cock H, 476 denotes a fuel cock or valve body and 477 a plug normally retained in a chamber 478 projecting from valve body 476. Said plug 477 is held in the body 476 by a cartridge device 479 containing an explosive mixture 450" and incorporating a screwed stud 480 having a thin flange 481 and a sleeve 448", igniter fitting 449" and fuse holder 451" identical to the parts 448, 449, 450, 451 in Figure 4.

The leads 350, 351 from the fuse in fuse holder 451" are connected to terminals 482 and 483 in terminal block 484 provided with terminal cover 485 secured to the terminal block 484 by screws 486.

To the terminals 482, 483 are also connected leads 142, 144 attached to the terminals 8, 9 of block 6 (see Fig. 1A). A spring 487 is interposed between plug 477 and cartridge device 479, so that upon ignition of the cartridge device, when stud 480 is blown out by stripping of flange 481, the plug 477 moves transversely across the bore through body 476 to stop fluid passage therethrough, spring 487 then ensuring retention of the plug 477 in its closing position.

Referring to Figures 12 and 13 showing details of accumulator cut-out switch m, 488 and 489 denote two of four substantial section contact studs to which heavy current conducting cables 129, 126 and 130, 125 (Fig. 1) can be connected by means of nuts 490 and 491. Studs 488 and 489 are mounted in an insulating base 492 provided with spacing flanges 493 adapted to reduce risk of electrical contact between adjacent studs.

Each pair of studs 488 and 489 is adapted to be bridged by substantial current carrying capacity bridge members 494, 498 secured by studs 495, 497 to a transverse insulating actuator 496.

Actuator 496 is provided with a strut member 499 adapted to engage a transverse pin 546 having a flange 546a and mounted in the bore of a cartridge device 500, said device being provided with a sleeve 548 and an igniter fitting 549 similar to the corresponding parts 446, 446A, 448, 449 in Figure 4, the chamber and sleeve 548 being loaded with explosive substance 550.

For accumulator cut-out switch m, delay action fuse 501 is secured by fuse holder 502 in cartridge device 500 and is provided with an insulating terminal block 503 and terminal block cover 504, whereby the leads 163, 164 of cable 165 (Figs. 1, 12 and 13) are connected to the ignition wires 163' and 164' in delay action fuse 501 (Fig. 13) and to terminals 23 and 25 on terminal block 22 (Figure 1).

Cartridge device 500 is secured in a head fitting 505 adapted to screw into the top of the casing 506 of the switch, and the head 505 is provided with a cap device 507 adapted to trap pin 546 when this is blown out by the explosive substance 550, and by this means the strut 499 is free to move upwards under action of spring 508, acting upon actuator 496 and resting upon a flange disc 509 mounted in insulation base 492. The contact bridges 494, 498 are then moved from the position shown in Figure 12 to the position shown in Figure 13, breaking the circuit through the switch.

Springs 510 and 511 are provided between actuator 496 and bridges 494 and 498, these springs permitting a certain amount of tilting of bridges 494 and 498, and providing resiliency to ensure good contact between the contact studs 488, 489 and the bridges 494, 498.

Figure 17:
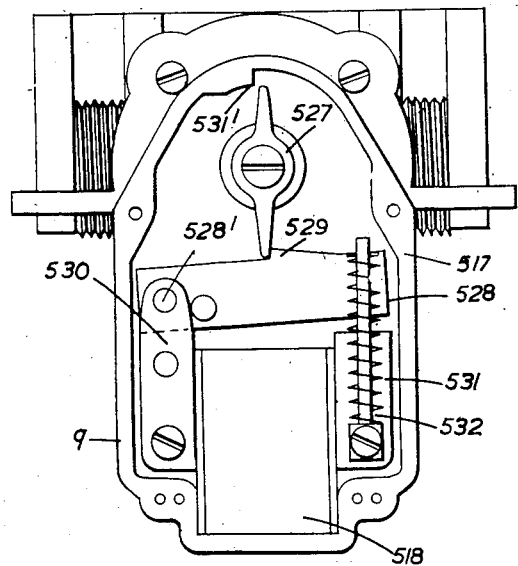
Figure 17 is a plan view of Figure 15 showing the top cover removed.

Referring now to Figures 14 and 17 the automatic control unit device q for each engine (see Fig. 2) comprises a casing 512 on which are mounted sets of pairs of contact springs 513 and 514 (see Fig. 16) connected by suitable leads to the pairs of terminals 178—179, 309—310, 315—316, 324—325, 336—337, in terminal block 515 provided with cover 516.

Casing 512 is provided with a top cover or casing 517 in which is mounted an electromagnet 518, this being covered by a top cover 519. Casing 512 is furthermore provided with a base fitting or bottom wall 520 to which a body 521 of a modified form of cock H' (Fig. 14) is secured.

Contact springs 513 and 514 are actuated by an insulation cam 522 secured upon a spindle 523, which spindle passes through a bearing 525 in cover 517.

A powerful coiled spring 526 is secured at one end to spindle 523 and at the other end to casing 512, so that tension can be applied thereby to the spindle 523.

A wing nut 527 is secured to the end of spindle 523 projecting into cover 517, one of the wings of this nut engaging with a tooth 529 of an armature 528 as shown in Figure 17. The armature 528 is pivotally mounted at 528' on a support 530 and is urged by means of springs 531 fitted on guide pins 532, into engagement with the wing of nut 527.

Upon energisation of the magnet 518, the armature 528 is moved into contact with the cored ends of magnet 518, thereby releasing the wing nut 527, whereby the projecting wing moves into contact with a stop 531' in cover 517, and by this means a rotary movement of 180° can be imparted to spindle 523 and cam 522, whereby contact springs 513 and 514 are opened or closed as required.

To obtain direct mechanical actuation of the fuel cock body control device q the fuel cock body 521 is provided with a plug 533 adapted to fit into a sleeve 534 in the cock body. The plug 533 is provided with an actuating spindle 535 secured by means of a flange to plug 533 by screws 536.

The plug 533 is also provided with a concentric projection 537 provided with a pin 538 which is adapted to engage a cam 539 restricting the movement of the plug to an angle of 90°, whereby the cock can be brought from the fully open to the fully closed position. Cam 539 is secured in plug body 521 by a cap 540. The lower end of the cock body 521 is supported by a bracket device 541.

To effect actuation of plug 533, spindle 535 has a lever 542 secured thereto, said lever being adapted to be engaged by a cam 543 secured internally in cam 522.

Cam 543 is provided with a hump 544 which passes under the end of lever 542 when cam 522 rotates, and by this means plug 533 is lifted off its seat so as to facilitate its rotation.

As lever 542 only passes through an angle of 90° whereas cam 522 rotates to 180°, the hump 544 will pass under the end of lever 542, and a spring 545 acting upon a collar fitting 546 on the end of spindle 535 serves to force the hump 544 back on to its seating to obtain an effective shut-off action.

As will be appreciated, the device as shown in the normal position in Figures 14 and 17 permits contact springs 513 and 514 to remain in the open position, the cock H' being fully open to fuel flow. Upon operation of flame switches I (Fig. 2), energising current will be supplied from the terminals 4 and 5 (Figs. 1B and 2) to electro-magnet 518, thereby permitting rotation of cam 522 through 180° to close contact springs 513 and 514, whereby the aero engine ignition system is cut out, the air-screw feathering mechanism is energised, the warning lamp $j$ is lighted, the fuse in delay action switch $f$ is energised, and fuel cock H' is at the same time mechanically rotated through 90° to shut off the fuel flow.

After stoppage of the engine and removal of the cause of fire, the wing nut 127 can be rotated into the position shown in Figures 14 and 17, restoring the spring contacts and the fuel cock to the open position, after which the aero engine can be restarted.

The operation of the system will now be described:

In the case of fires in the air in one of the aero engine compartments, one or more of the flame or temperature rise detecting switches $i$ will operate in the case of Figures 1, 1a and 1b, to light the appropriate warning lamp $j$ on the pilot's instrument panel or the like.

On receipt of this warning the pilot will operate the appropriate push button switch $k$ which effects actuation of extinguisher $e$ which is discharged into the air intake of the engine thereby causing this to cut-out and cease firing.

Simultaneously operation of the air-screw feathering device $d$ is initiated to initiate feathering of the air-screw, cock $h$ is closed to shut off the fuel supply to the aero engine, and the delay action fuse in switch $f$ is ignited to effect discharge of the external spray extinguisher $g$ after a ten seconds' delay, this external spray extinguisher discharging through the usual type of spray pipe system associated with aero engines upon the exterior parts of the engine.

As the result of the operation of the above described appliances, the air-screw will be rotated into the feathered position causing it to cease to rotate, the air intake carburettor system and supercharged, the induction pipe system and the engine cylinders will be filled with fire extinguishing fluid thus rendering the usual explosive mixture non-combustible, and owing to the shut-off of the fuel supply the engine will be locked up and inoperative until the cause of the fire has been discovered and remedied and the various appliances replaced or reset to normal position.

In the case of the system shown in Figure 2, a fire in any one of the engine nacelles will cause operation of the flame or temperature rise detector devices I thus causing operation of the engine control device $q$, when the system is arranged for automatic operation.

Operation of this engine control $q$ device will effect operation of the ignition cutoff switch $r$, will initiate operation of the air-screw feathering motor, cock $h$ to shut off the fuel or oil supply and effect operation of delay action fuse in switch $f$ to discharge external spray extinguisher $g$ after ten seconds delay, the warning lamp $j$ being lighted at the same time.

If the system is arranged for semi-automatic operation, for example, during take off or landing operations, manually operable switch $s$ will have been moved into the open position, and in that case engine control device $q$ will not operate until switch $s$ is moved into the closed position when, for example, the aircraft is airborne or has come to rest on the landing ground if there is a fire in one of the engine compartments.

The system shown in Figures 3, 3A and 3B, operates identically to Figure 1 in the case of a fire in the air except for the provision of several extinguishers $t$ and flame detecting switches $u$ associated with the fuel tanks in the aircraft, the extinguisher $t$ associated with any particular fuel tank being discharged by flame switch $u$ associated with the same fuel tank when a fire occurs on this tank.

As previously stated, inertia switches $n$ will cause immediate commencement of discharge of all the extinguishers $e$, $g$, and $t$ in the case of a crash, and similarly in the case of a turnover on the ground when the undercarriage is down, so that switch $p$ is closed gravity switch $o$ will effect immediate commencement of discharge of extinguishers $e$ and $g$ if the aircraft turns over.

Having thus fully described my invention, what I claim as new and desire to protect by Letters Patent is:

1. In fire-fighting equipment for multi-engine aircraft power plants, electrically actuatable individual containers of fire-extinguishing fluid, for each engine, individual manually operable electrical switch means on the pilot's control panel, individual connections from each of said switch means to each of said containers respectively for respectively individually releasing said containers, individual fluid distributing means connected to each said container for distributing extinguishing fluid to its respective engine, a multiple contact electromagnetic relay having an actuating winding, individual connections to each of said containers from the respective contacts of said multiple contact relay, and an impact operated switch connected to the actuating winding of said relay.

2. In fire-fighting equipment for multi-engine aircraft power plants, a first set of electrically dischargeable individual containers of fire-extinguishing fluid comprising one container for each engine, individual manually operable electrical switch means on the pilot's control panel, individual connections from each of said switch means to each of said first set of containers respectively for respectively individually releasing said first set of containers, individual fluid distributing means connected to each of said first set of containers for distributing extinguishing fluid to the air and fuel intake system of its respective engine, a multi-contact switch unit comprising impact operable actuating means, individual connections from the respective contacts of said multi-contact switch unit to each of said first set of containers respectively for discharging all of said first set of containers automatically instantaneously upon operation of said impact switch, a second set of electrically dischargeable individual containers of fire-extinguishing fluid for each engine, individual fluid distributing means connected to each of said second set of containers for spraying extinguishing fluid upon the exterior of the respective engine, individual connections comprising time delay means of predetermined time delay from each of said manually operable switch means respectively to each of said second set of containers for respectively individually releasing said second set of containers, and individual direct connections from contacts of said switch unit to each of said second set of containers for instantaneously and without time delay discharging all of said second set of containers upon operation of said switch unit simultaneously with the discharge of said first set of containers.

3. In fire-fighting equipment for multi-engine aircraft power plants, electrically dischargeable individual containers of fire-extinguishing fluid for each engine, individual manually operable electrical switch means on the pilot's control panel, individual connections from each of said switch means to said containers respectively for respectively individually releasing said containers, individual fluid distributing means connected to each said containers for distributing extinguishing fluid to its respective engine, a multi-contact switch unit comprising impact operable actuating means, individual connections from the respective contacts of said multi-contact switch unit to said containers respectively for operating all of said containers automatically instantaneously upon operation of said switch unit, a source of electric power, an electrically actuatable time delay switch, connections comprising said time delay switch extending from said source and connected for supplying electrical energy to said previously recited connections to said containers, and connections extending from the actuating terminals of said electrically actuatable time delay switch to said manual switch means and to said impact switch unit for causing said time delay switch to open after a determined delay after closing of either said manual switch means or said impact switch unit.

4. In fire-fighting equipment for multi-engine aircraft power plants, electrically actuatable individual containers of fire-extinguishing fluid for each engine, individual manually operable electrical switch actuating means on the pilot's control panel, individual fluid distributing means connected to each said container for distributing extinguishing fluid to its respective engine, individual air-screw feathering mechanism for each engine, individual electrically actuatable actuating means for controlling each said air-screw feathering mechanism for each engine, individual connections from each of said switch means to each of said containers and to each of said air-screw control means respectively for respectively releasing said containers and feathering said mechanisms, a multi-contact switch unit comprising impact operable actuating means, individual connections from the respective contacts of said multi-contact switch unit to each of said containers and to each of said air-screw control means respectively for operating all of said containers and all of said air-screw control means automatically upon operation of said switch unit.

5. In fire-fighting equipment for multi-engine aircraft power plants, a first set of electrically dischargeable individual containers of fire-extinguishing fluid for each engine, individual manually operable electrical switch means on the pilot's control panel, individual fluid distributing means connected to each of said first set of containers for distributing extinguishing fluid to the combustible intake system of its respective engine, individual air-screw feathering mechanism for each engine, individual electrically actuatable actuating means comprising explosive means for actuating each of said air-screw feathering mechanisms for each engine, individual connections from each of said switch means to each of said first set of containers and to each of said actuating means respectively for respectively releasing said containers and feathering said mechanisms, a multi-contact switch unit comprising impact operable actuating means, individual connections from the respective contacts of said multi-contact switch unit to each of said first set of containers respectively and to each of said actuating means respectively for operating all of said containers and all of said actuating means automatically upon operation of said switch unit, a second set of electrically dischargeable individual containers of fire-extinguishing fluid for each engine, individual fluid distributing means connected to each of said second set of containers for spraying extinguishing fluid upon the exterior of the respective engine, individual connections comprising explosive means of predetermined time delay from each said manually operable switch means respectively to each of said second set of containers for respectively individually releasing said second set of containers, the time delay means of said second set of containers providing for a substantially longer time delay than the operating time of said feathering actuating means, and individual direct connections from contacts of said switch unit to each of said second set of containers for instantaneously and without time delay discharging all of said second set of containers upon operation of said switch unit.

6. In fire-fighting equipment for multi-engine aircraft power plants, electrically actuatable individual containers of fire-extinguishing fluid for each engine, individual fluid distributing means connected to each said container for distributing extinguishing fluid to its respective engine, individual multi-contact electromagnetic control units for each engine, individual fire-actuatable electric switches for each engine and respectively connected to the actuating windings of each of said control units, individual air-screw feathering mechanism for each engine, individual actuating means for actuating each said air-screw feathering mechanism for each engine, each said actuating means being connected to a first set of contacts of the corresponding control unit, each said container being connected to a second set of contacts of said control unit.

7. Equipment as set forth in claim 6, and individual manually operable electrical switch means on the pilot's control panel and being connected to each of said containers respectively.

8. In fire-fighting equipment for an aircraft power plant having air-screw feathering mechanism, the combination comprising at least one fire-extinguishing fluid container, a stopping device adapted to effect stoppage of the power plant, discharge means to effect discharge of said container, and actuating means in operative relation with said discharge means and with said stopping device, said actuating means being arranged and adapted upon occurrence of a fire to cause said discharge means to effect discharge of said container and to effect operation of said stopping device, said actuating means including a plurality of electrical switch contacts, one pair of said contacts being connected and adapted to close a circuit to actuate said discharge means and to effect discharge of fluid from said container over said power plant when a fire occurs, and a second pair of contacts being connected and adapted at the same time to close a second circuit which is connected and adapted to initiate operation of the air-screw feathering mechanism for feathering operation of the air-screw.

9. In fire-fighting equipment for an aircraft power plant having air-screw feathering mechanism, the combination comprising at least one fire-extinguishing fluid container, stopping device adapted to effect stoppage of the power plant, discharge means to effect discharge of said container and actuating means in operative relation with said discharge means and with said stopping device, said actuating means being arranged and adapted upon occurrence of a fire to effect discharge of said container and to effect operation of said stopping device, an accumulator, said actuating means including an accumulator cut-out switch, a delay action device and a device comprising a plurality of electrical switch contacts, one pair of said contacts being connected and adapted to effect stoppage of the engine when a fire occurs, a second pair of contacts being connected and adapted to initiate operation of the air-screw feathering mechanism for feathering operation of the air-screw, and a third pair of contacts being connected and adapted to initiate operation of said delay action switch device and to cause said delay action device after a predetermined time lag to open the cut-out switch after discharge of the container over the power plant has been effected.

10. Fire-fighting equipment as recited in claim 2, said switch unit comprising an electrically actuatable multi-contact switch and an impact actuatable circuit closing element connected for actuating said multi-contact switch.

11. Fire-fighting equipment as recited in claim 2, and an electrically actuatable air-screw feathering mechanism control device, and connections from said manually operable switch means and said switch unit to said feathering control mechanism for causing feathering actuation thereof.

12. In fire-fighting equipment for multi-engine aircraft power plants, a first set of electrically dischargeable individual containers of fire-extinguishing fluid comprising one container for each engine, individual fluid distributing means connected to each of said first set of containers for distributing fluid to the air and fuel intake system of its respective engine, a multi-contact switch unit comprising impact operable actuating means, a second set of electrically dischargeable individual containers of fire-extinguishing fluid comprising one container for each engine, individual fluid distributing means connected to each of said second set of containers for spraying extinguishing fluid upon the exterior of the respective engine, an electrically actuatable fuel shut-off valve, an electrically actuatable air-screw feathering mechanism control device, and connections from the respective contacts of said multi-contact switch unit to each container of said first and second sets of containers and to said valve and said feathering control device for actuating the same when impact is applied to said unit.

13. Fire-fighting equipment as recited in claim 12, and a third set of electrically dischargeable individual containers of fire-extinguishing fluid comprising one container for each fuel tank, individual fluid distributing means connected to each of said third set of containers for spraying extinguishing fluid over the exterior of said fuel tanks respectively, and connections from contacts of said multi-contact switch unit to each container of said third set of containers.

14. In fire-fighting equipment for aircraft power plants, the combination of a plurality of fire-extinguishing fluid containers, temperature responsive actuating means, a control device responsive to said actuating means and adapted to effect stoppage of the power plant upon being placed in operation by said actuating means, and a delay action device responsive to said actuating means to effect discharge of one or more of said containers a predetermined time after said control device has been placed in operation to stop said power plant.

15. In fire-fighting equipment for aircraft power plants the combination of air-screw feathering mechanism for the air-screw of the power plant, a plurality of fire-extinguishing fluid containers, temperature responsive actuating means, a control device responsive to said actuating means and adapted to effect stoppage of the power plant upon being placed in operation by said actuating means, means connected to said actuating means for effecting operation of said air-screw feathering mechanism, and a delay action device responsive to said actuating means to effect discharge of one or more of said containers a predetermined time after said control device has been placed in operation to stop said power plant.

16. In fire-fighting equipment for aircraft power plants the combination of air-screw feathering mechanism for the air-screw of the power plant, air and fuel intake system for said power plant, a plurality of fire-extinguishing fluid containers, an auxiliary extinguishing fluid container connected to said air and fuel intake system, temperature responsive actuating means, a control device responsive to said actuating means and adapted to effect stoppage of the power plant upon being placed in operation by said actuating means, means connected to said actuating means for effecting operation of said air-screw feathering mechanism, and a delay action device responsive to said actuating means to effect discharge of one or more of said containers a predetermined time after said control device has been placed in operation to stop said power plant.

17. In fire-fighting equipment for aircraft power plants the combination of air-screw feathering mechanism for the air-screw of the power plant, air and fuel intake system for said power plant, a plurality of fire-extinguishing fluid containers, an auxiliary extinguishing fluid container connected to said air and fuel intake system, temperature responsive actuating means, a control device responsive to said actuating means and adapted to effect stoppage of the power plant upon being placed in operation by said actuating means, means connected to said actuating means for effecting operation of said air-screw feathering mechanism, a delay action device responsive to said actuating means to effect discharge of one or more of said containers a predetermined time after said control device has been placed in operation to stop said power plant, said control means comprising a shut off valve in said supply pipe, and means connecting said valve to said actuating means, for causing said actuating means to close said valve when a fire occurs.

18. In fire-fighting equipment for aircraft having a plurality of power plants, the combination comprising a plurality of fire-extinguishing fluid containers, at least one container being associated with each power plant, discharge control means for discharging each said container, actuating means in operative relation with said discharge means, said actuating means including impact operated switch means, the arrangement being such that all of said containers are discharged simultaneously when the aircraft is subject to abnormal deceleration, said equipment including an accumulator, an accumulator cutout switch, delay action means for said cutout switch, and leads connecting said accumulator, said last mentioned means and said switches to said impact operated switch means, whereby said cutout switch disconnects said leads to said discharge control means of said containers after a predetermined time lag determined by said delay action means to enable said containers to be actuated electrically before said cutout switch is opened.

19. In fire-fighting equipment for an aircraft power plant the combination of a plurality of fire-extinguishing fluid containers, temperature responsive actuating means including at least one flame and temperature responsive electrical switch device, a control device connected to said actuating means and adapted to effect stoppage of the power plant upon being placed in operation by said actuating means, an auxiliary container connected to the fuel intake of the aircraft power plant connected to be discharged into said fuel intake by said actuating means, and a delay action device responsive to said actuating means to effect discharge of one or more of said containers a predetermined time after said control device has been placed in operation to stop said power plant.

ANDERS MATHISEN.

REFERENCES CITED

The following references are of record in the file of this patent:

UNITED STATES PATENTS

| Number | Name | Date |
| --- | --- | --- |
| 1,427,830 | McCauley | Sept. 5, 1922 |
| 1,630,251 | Bechard | May 31, 1927 |
| 2,015,995 | Egtvedt | Oct. 1, 1935 |
| 2,189,147 | Mathisen | Feb. 6, 1940 |
| 2,207,189 | Austin et al. | July 9, 1940 |
| 2,228,776 | Mullen | Jan. 14, 1941 |
| 2,242,679 | Salmond et al. | May 20, 1941 |
| 2,309,106 | Doxsey et al. | Jan. 26, 1943 |
| 2,320,305 | Rowley | May 25, 1943 |

FOREIGN PATENTS

| Number | Country | Date |
| --- | --- | --- |
| 115,466 | Australia | Dec. 24, 1941 |
| 216,792 | Great Britain | June 5, 1924 |

OTHER REFERENCES

Design Recommendations for Fire Protection of Aircraft Powerplant Installations—Technical Development Note No. 31, U. S. Dept. of Commerce C. A. A., Washington, D. C., September 1943.